(12) United States Patent
Van Straten

(10) Patent No.: US 12,471,646 B2
(45) Date of Patent: Nov. 18, 2025

(54) EYEWEAR WITH A HEATER FOR EYES AND FACE

(71) Applicant: Van Straten Enterprises, Inc., Chassell, MI (US)

(72) Inventor: George A. Van Straten, Chassell, MI (US)

(73) Assignee: Van Straten Enterprises, Inc., Chassell, MI (US)

( * ) Notice: Subject to any disclaimer, the term of this patent is extended or adjusted under 35 U.S.C. 154(b) by 0 days.

(21) Appl. No.: 18/922,071

(22) Filed: Oct. 21, 2024

(65) Prior Publication Data
US 2025/0040636 A1    Feb. 6, 2025

Related U.S. Application Data

(63) Continuation of application No. 17/578,211, filed on Jan. 18, 2022, now Pat. No. 12,121,088.

(60) Provisional application No. 63/140,157, filed on Jan. 21, 2021.

(51) Int. Cl.
| | | |
|---|---|---|
| A41D 13/11 | (2006.01) | |
| G02C 5/02 | (2006.01) | |
| G02C 7/02 | (2006.01) | |
| G02C 11/00 | (2006.01) | |

(Continued)

(52) U.S. Cl.
CPC ...... *A41D 13/1184* (2013.01); *A41D 13/1161* (2013.01); *G02C 5/02* (2013.01); *G02C 7/022* (2013.01); *G02C 11/10* (2013.01); *H05B 3/06* (2013.01); *H05B 3/40* (2013.01)

(58) Field of Classification Search
CPC .. A41D 13/1184; A41D 13/1161; G02C 5/02; G02C 7/022; G02C 11/10; G02C 11/08; H05B 3/06; H05B 3/40
See application file for complete search history.

(56) References Cited

U.S. PATENT DOCUMENTS

| | | |
|---|---|---|
| 4,086,467 A | 4/1978 | Grant |
| 4,147,927 A | 4/1979 | Pirotte |
| 4,208,570 A | 6/1980 | Rynard |

(Continued)

FOREIGN PATENT DOCUMENTS

| | | |
|---|---|---|
| CN | 203346290 | 12/2013 |
| EP | 20794718 | 12/2022 |

(Continued)

OTHER PUBLICATIONS

U.S. Appl. No. 62/037,430, filed Aug. 14, 2014; G. Van Straten.

(Continued)

*Primary Examiner* — Tracie Y Green
(74) *Attorney, Agent, or Firm* — Keith D. Grzelak; Wells St. John P.S.

(57) ABSTRACT

An optical face protection shield is provided having a support body, an optic lens, and an elongate heater. The support body has a user interface. The optic lens is carried by the support body over a user's face configured to protect a user. The elongate heater is carried by the optic lens so as to traverse an expansive surface area of the optic lens. The elongate heater has an elongate resistive heating element and an outer thermally transmissive, peak temperature mitigating, and an electrically insulative cover material encompassing the resistive heating element. A method is also provided.

20 Claims, 18 Drawing Sheets

(51) Int. Cl.
  *H05B 3/06* (2006.01)
  *H05B 3/40* (2006.01)

(56) References Cited

U.S. PATENT DOCUMENTS

| | | |
|---|---|---|
| 4,282,003 A | 8/1981 | Kayanuma |
| 4,395,623 A | 7/1983 | Shimada |
| 4,728,775 A | 3/1988 | Van Straten |
| 4,822,980 A | 4/1989 | Carbone |
| 4,868,929 A | 9/1989 | Curcio |
| 4,870,249 A | 9/1989 | Kayanuma |
| 5,134,684 A | 7/1992 | Mishou |
| 5,368,654 A | 11/1994 | Bergevin |
| 5,459,533 A | 10/1995 | McCooeye et al. |
| 6,058,718 A | 5/2000 | Forsberg et al. |
| 6,180,930 B1 | 1/2001 | Wu |
| 6,283,656 B1 | 9/2001 | Jiang |
| 6,422,729 B1 | 7/2002 | Rohrbach |
| 6,601,983 B1 | 8/2003 | Runfola et al. |
| 6,902,287 B2 | 6/2005 | Taylor |
| 6,982,400 B1 | 1/2006 | Nguon |
| 7,262,388 B2 | 8/2007 | Moreth et al. |
| 7,281,811 B2 | 10/2007 | Thuot Rann et al. |
| 7,335,855 B2 | 2/2008 | von der Lube |
| 7,914,162 B1 | 3/2011 | Huang |
| 8,109,264 B1 | 2/2012 | Murray |
| 8,314,559 B1 | 11/2012 | Helms et al. |
| 8,399,805 B2 | 3/2013 | Biddell |
| 8,459,848 B2 | 6/2013 | Marley |
| 9,234,656 B2 | 1/2016 | Blondin |
| 9,377,214 B2 | 6/2016 | Krystad |
| 9,605,880 B2 | 3/2017 | Van Straten |
| 9,623,790 B2 | 4/2017 | Van Straten |
| 9,726,362 B2 | 8/2017 | Rosen |
| 10,046,692 B2 | 8/2018 | Van Straten |
| 10,272,818 B2 | 4/2019 | Van Straten |
| 11,231,171 B2 | 1/2022 | Van Straten |
| 11,754,275 B2 | 9/2023 | Van Straten |
| 12,121,088 B2 * | 10/2024 | Van Straten ............. H05B 3/06 |
| 2006/0245202 A1 | 11/2006 | Moreth |
| 2006/0289464 A1 | 12/2006 | Von Der Luhe |
| 2007/0181565 A1 | 8/2007 | Murahashi |
| 2009/0086188 A1 | 4/2009 | Onojima |
| 2009/0151057 A1 | 6/2009 | Label et al. |
| 2009/0188231 A1 | 7/2009 | Song |
| 2009/0289656 A1 | 11/2009 | Matsumoto |
| 2010/0006554 A1 | 1/2010 | Inoue et al. |
| 2010/0008099 A1 | 1/2010 | Inoue et al. |
| 2011/0228529 A1 | 9/2011 | Patel et al. |
| 2012/0005856 A1 | 1/2012 | Jones |
| 2012/0175149 A1 | 7/2012 | Ihle |
| 2012/0193338 A1 | 8/2012 | Sullivan |
| 2012/0201031 A1 | 8/2012 | Marley |
| 2013/0043234 A1 | 2/2013 | Tsai et al. |
| 2013/0114279 A1 | 5/2013 | Marley |
| 2013/0249375 A1 | 9/2013 | Panagotacos |
| 2014/0183180 A1 | 7/2014 | Watakabe |
| 2014/0184075 A1 | 7/2014 | Ter-Hovhanissian |
| 2014/0334170 A1 | 11/2014 | Zhong |
| 2015/0034621 A1 | 2/2015 | Timmermann |
| 2015/0055363 A1 | 2/2015 | Van Straten |
| 2015/0055944 A1 | 2/2015 | Van Straten |
| 2015/0204533 A1 | 7/2015 | Rosen et al. |
| 2015/0276163 A1 | 10/2015 | Singh |
| 2015/0286073 A1 | 10/2015 | Blum |
| 2015/0369445 A1 | 12/2015 | Orr |
| 2016/0046262 A1 | 2/2016 | Van Straten |
| 2016/0075823 A1 | 3/2016 | Imazato |
| 2016/0109088 A1 | 4/2016 | Orr et al. |
| 2016/0209022 A1 | 7/2016 | Cai et al. |
| 2016/0215952 A1 | 7/2016 | Dunn et al. |
| 2016/0273801 A1 | 9/2016 | Kapila |
| 2016/0307666 A1 | 10/2016 | Kamidaki |
| 2016/0363286 A1 | 12/2016 | Deering |
| 2017/0175971 A1 | 6/2017 | Tai |
| 2017/0234503 A1 | 8/2017 | Buffone |
| 2017/0240093 A1 | 8/2017 | O'Sullivan |
| 2017/0327028 A1 | 11/2017 | Van Straten |
| 2017/0363266 A1 | 12/2017 | Feil |
| 2018/0043862 A1 | 2/2018 | Lesmeister |
| 2018/0106448 A1 | 4/2018 | Shiraishi |
| 2018/0204533 A1 | 7/2018 | Sasaki et al. |
| 2019/0017676 A1 | 1/2019 | Van Straten |
| 2019/0176680 A1 | 6/2019 | Van Straten |
| 2020/0196394 A1 | 6/2020 | Holleczek |
| 2021/0083519 A1 | 3/2021 | Yamamoto |
| 2022/0225703 A1 | 7/2022 | Algee |

FOREIGN PATENT DOCUMENTS

| | | |
|---|---|---|
| GB | 783097 | 9/1957 |
| WO | WO 2015/106024 | 7/2015 |
| WO | PCT/US2018/041887 | 2/2019 |
| WO | PCT/US2020/029988 | 7/2020 |

OTHER PUBLICATIONS

U.S. Appl. No. 63/140,157, filed Jan. 21, 2021; G. Van Straten.
U.S. Appl. No. 61/868,522, filed Aug. 21, 2013; G. Van Straten.
U.S. Appl. No. 62/135,060, filed Mar. 18, 2015; G. Van Straten.

* cited by examiner

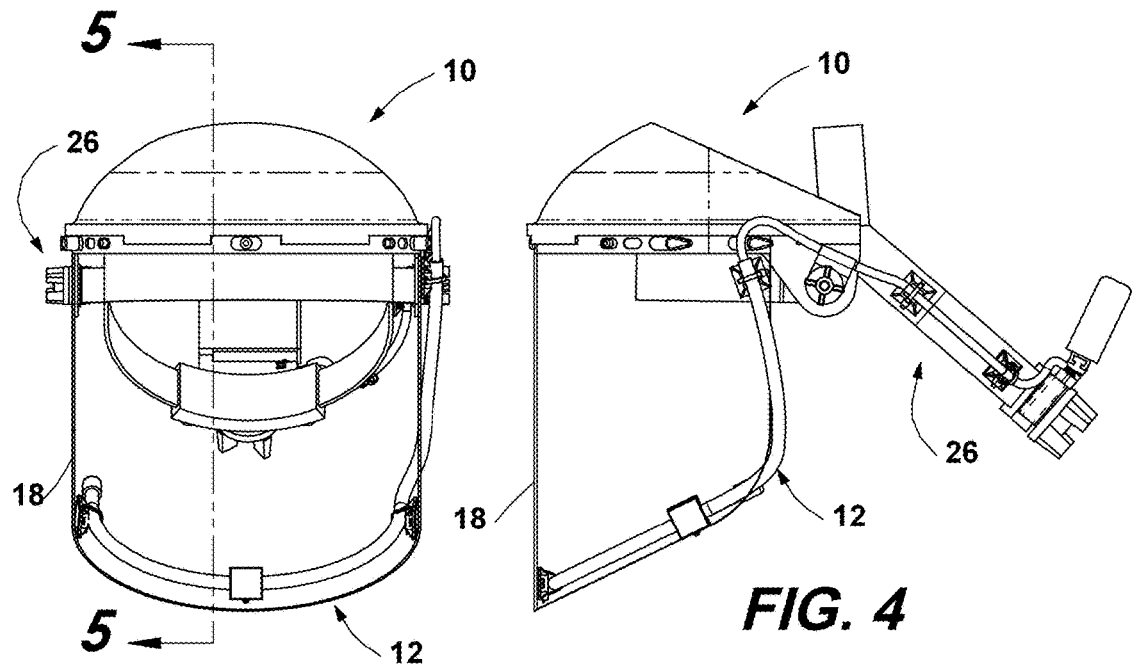
FIG. 3
FIG. 4
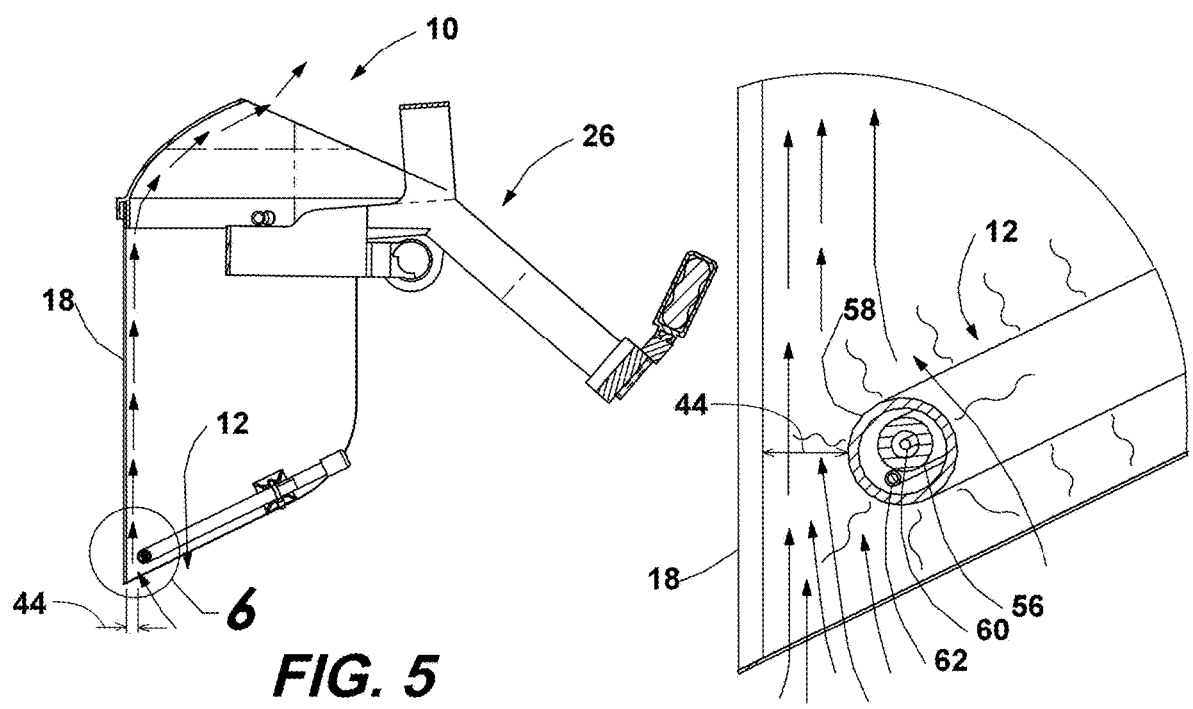
FIG. 5
FIG. 6

EYEWEAR WITH A HEATER FOR EYES AND FACE

CROSS REFERENCE TO RELATED APPLICATIONS

This patent resulted from a continuation of U.S. patent application Ser. No. 17/578,211 filed Jan. 18, 2022 entitled Optical Face Protection Shield, Heated Optical Face Protection Apparatus, and Method, which claims priority to and the benefit of U.S. Provisional Patent Application Ser. No. 63/140,157 filed on Jan. 21, 2021 entitled Face Shield Heater and Eyeglass Heater, the entirety of each of which is incorporated by reference herein.

TECHNICAL FIELD

This disclosure pertains to heaters for eye and face protection. More particularly, this disclosure relates to heaters for face shields, eyeglasses, and goggles to remove condensation from optical shields used by manufacturing workers, construction workers, healthcare workers and anyone in need of face protection requiring optical clarity and visibility through the face shield.

BACKGROUND OF THE DISCLOSURE

Techniques are known for heating one or more lenses in a face mask, such as a scuba mask, eyeglasses, face shields or goggles. However, improvements are needed to enhance operation, aesthetic configuration layout, power supply interchangeability, airflow contamination, efficient heat delivery, and air flow convection and conveyance pathways on a face shield, mask, goggles, and/or eyeglasses.

SUMMARY OF THE INVENTION

A heater is provided for a mask or eyeglasses, such as a face shield or eyeglasses rendering an optically transmissive portion of a lens capable of removing or mitigating condensate, moisture, ice, snow and frost buildup that can interfere with a user having visibility while working in challenging conditions such as healthcare workers or manufacturing workers using such face shields to mitigate droplet transmissions during a viral pandemic, or for manufacturing workers needing protection from flying debris.

According to one aspect, an optical face protection shield is provided having a support body, an optic lens, and an elongate heater. The support body has a user interface. The optic lens is carried by the support body over a user's face configured to protect a user. The elongate heater is carried by the optic lens so as to traverse an expansive surface area of the optic lens. The elongate heater has an elongate resistive heating element and an outer thermally transmissive, peak temperature mitigating, and an electrically insulative cover material encompassing the resistive heating element.

According to another aspect, a heated optical face protection apparatus is provided having a support body, at least one lens, an elongate heating element, and a source of airflow. The support body is configured to be supported on a user. The at least one lens is carried by the support body and is configured to hold the at least one lens over an eye facial region of a user. The elongate heating element has an elongate tube and a heat source provided in the tube. The elongate heating element is carried by the body and is configured to traverse an expansive surface area of the at least one lens. The source of airflow communicates with the elongate heating element and is configured to drive airflow through the elongate heating element to heat the flow of air.

According to yet another aspect, a method is provided for heating an optical face protection apparatus. The method includes: providing a support body having a user interface, an optic lens carried by the support body, and an elongate heater spanning a portion of the optic lens; mating the user interface with a user to present the optic lens over a user's face; generating heat with the elongate heater; and distributing the generated heat to the optic lens to mitigate condensate occlusion on the lens.

BRIEF DESCRIPTION OF THE DRAWINGS

Exemplary embodiments of the various disclosures are described below with reference to the following accompanying drawings. The drawings may be considered to represent scale.

FIG. 3 is a front view of the face shield of FIGS. 1-2.

FIG. 4 is a right-side view of the face shield of FIG. 3.

FIG. 5 is a vertical sectional view of the face shield taken along line 5-5 of FIG. 3.

FIG. 6 is an enlarged view of the heater assembly and lens taken from the encircled region 6 of FIG. 5.

FIG. 21A is a transverse sectional view of the air filter element taken along section 21A-21A of FIG. 21.

DETAILED DESCRIPTION OF THE EMBODIMENTS

This disclosure is submitted in furtherance of the constitutional purposes of the U.S. Patent Laws "to promote the progress of science and useful arts" (Article 1, Section 8).

Eye and face protection can limit user visibility under certain conditions of temperature, humidity, especially when used in combination with masks during threat of a viral pandemic. During the recent outbreak of COVID-19, healthcare workers. manufacturing plant workers, restaurant workers, and business employees found themselves wearing masks and face shields to mitigate transmission of virus. However, constant use oftentimes leads to fogging of the lens on face shields and eyeglasses. This problem was further exacerbated when users wore face masks in combination with face shields. This resulted in risks to users as well as patients especially when used in a hospital setting. The addition of a portable heater source to face shields and eyeglasses has been found to mitigate such risks.

Figure 1:
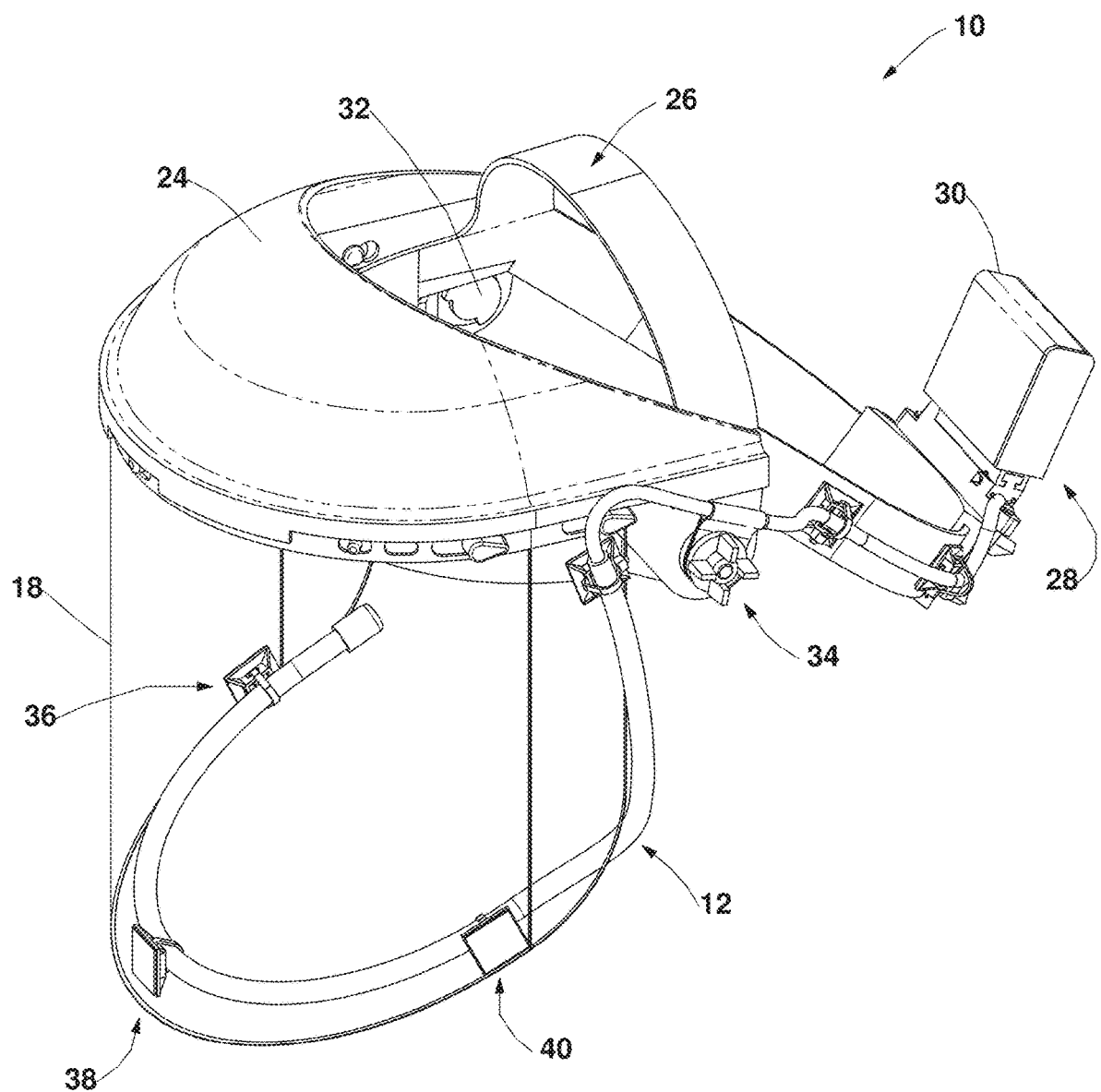
FIG. 1 is a front perspective view from above of a heated face shield having an elongate heater carried in spaced apart relation along a bottom edge of the face shield lens.

FIG. 1 illustrates one suitable construction for a heated face shield 10 having an elongate heater assembly 12 configured to mitigate condensate buildup on a lens 18 on face shield 10. Face shield 10 has a visor, or top hood 24 affixed atop lens 18 which downward extends in a semi-circular configuration. A pair of frictionable pivot fastener assemblies 32 and 34 is provided along opposed top edges of visor 24 to secure visor 24 and lens 18 in pivotable relationship relative to a user headband assembly 26 that is received atop a user's head. Such configuration enables raising and lowering of visor 24 and lens 18 while a user is wearing heated face shield 10. A plurality of adhesive backed mounting brackets 36, 38 and 40 are spaced apart along a bottom edge of lens 18 on an inner surface along with individual Nylon zip cable ties 52 (see FIG. 2). Mounting brackets 36, 38 and 40 support elongate heater assembly 12 in radially inwardly spaced apart relation from an inner surface of lens 18. Additionally, a battery support tray, or housing 28 is affixed onto a rear portion of headband assembly 26 configured to removably receive a battery pack 30.

Figure 2:
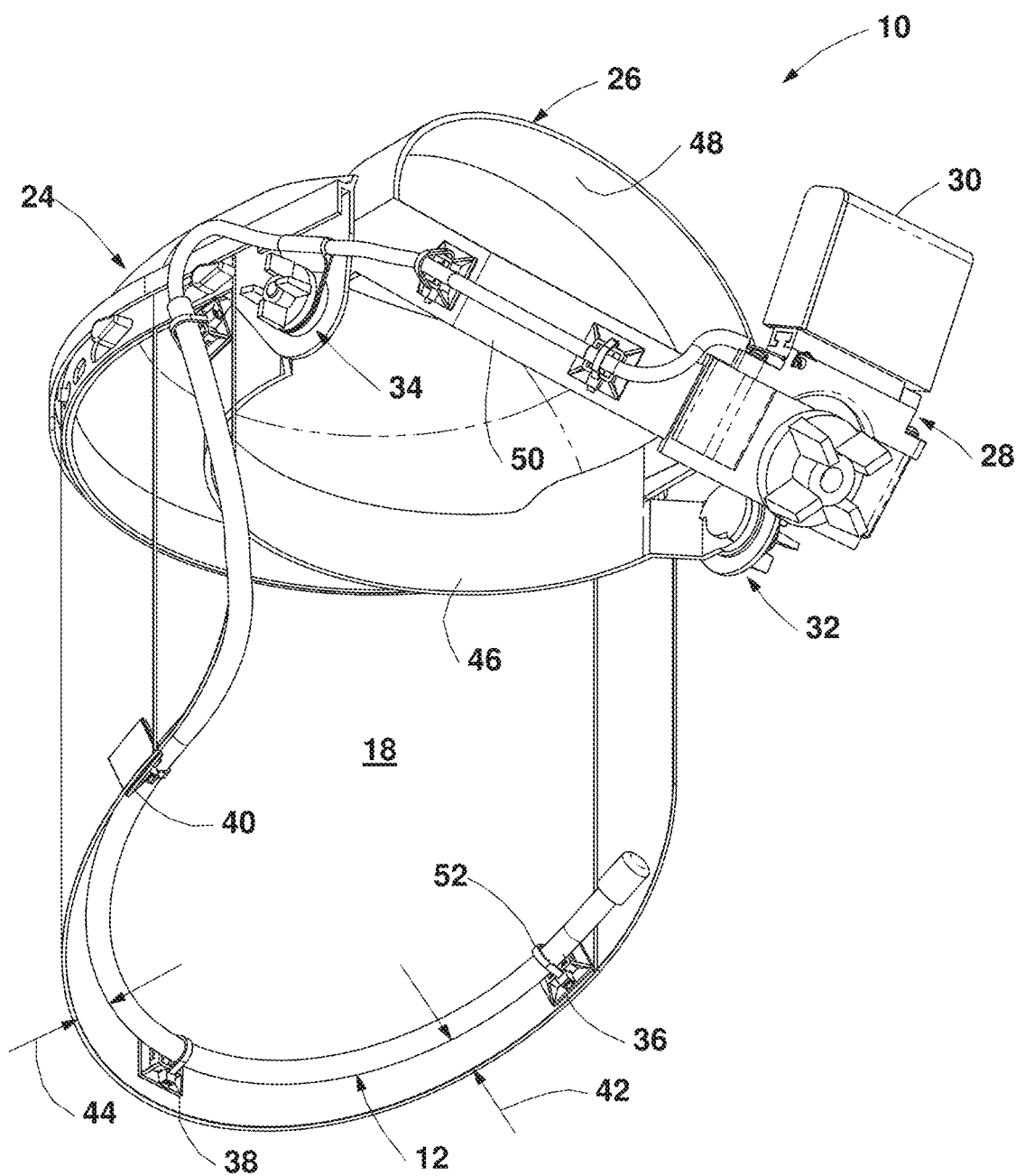
FIG. 2 is a rear perspective view from below of the heated face shield of FIG. 1.

FIG. 2 illustrates in greater detail features of heated face shield 10. More particularly, mounting brackets 36, 38 and 40 are adhesively affixed onto an inner surface of lens 18 and individual cable ties 52 affix heater tube assembly 12 at discrete, spaced-apart locations along lens 18 so as to provide arcuate air flow gaps 42 and 44 between lens 18 and heater assembly 12. Visor 24 and lens 18 are pivotally affixed onto head band frame 26 via a pair of friction lock threaded bolt and nut fastener assemblies 32 and Head band assembly 26, shown in FIG. 2, includes a front, or forehead band 46, a top head band 48, and a rear head band 50. A battery pack holster, or case 28 is affixed onto a rear portion of rear head band 50 and a rechargeable battery pack 30 is affixed onto case 28. One suitable battery pack is a lithium polymer battery. Another suitable battery pack is a Nickel metal hydride battery. Other types of batteries can also be used.

As shown in FIGS. 3 and 4, heated face shield 10 orients lens 18 in a vertical semi-cylindrical orientation when in use supporting shield 18 in front of a user's face, while heater assembly 12 is provided along a lowermost edge of shield 18 to mitigate condensate on an inner (and outer) surface of lens 18. Head band assembly 26 supports heated face mask 10 atop a user's head while in use.

FIG. 5 illustrates support of heater assembly 12 along a bottom edge of lens 18 of face shield 10 in spaced apart relation so as to provide convection air gaps, such as arcuate gap 44. While mounted on a user's head via head band assembly 26, lens 18 is oriented vertically when lowered in use and heat from heater assembly 12 rises along an inner surface drawing a vertical upward flow of air through gap 44 along an inner surface of lens 18 to impart upward convection airflow that exits from a top portion of face shield 10.

FIG. 6 illustrates the provision of a convective upward air flow gap 44 provided between an inner surface of lens 18 and heater assembly 12. More particularly, heater assembly 12 is affixed in spaced-apart relation from an inner surface of lens 18. Heat from heater assembly 12 rises, imparting upward convective air flow along an inner surface of lens 18 through air gaps, such as gap 44. Heater assembly 12 comprises a polytetrafluoroethylene (PTFE) inner tube 56, a polytetrafluoroethylene (PTFE) outer tube 58, a central, or coaxial inner resistive heating wire, or Nichrome wire 60 and an insulated return ground wire 62.

Figure 7:
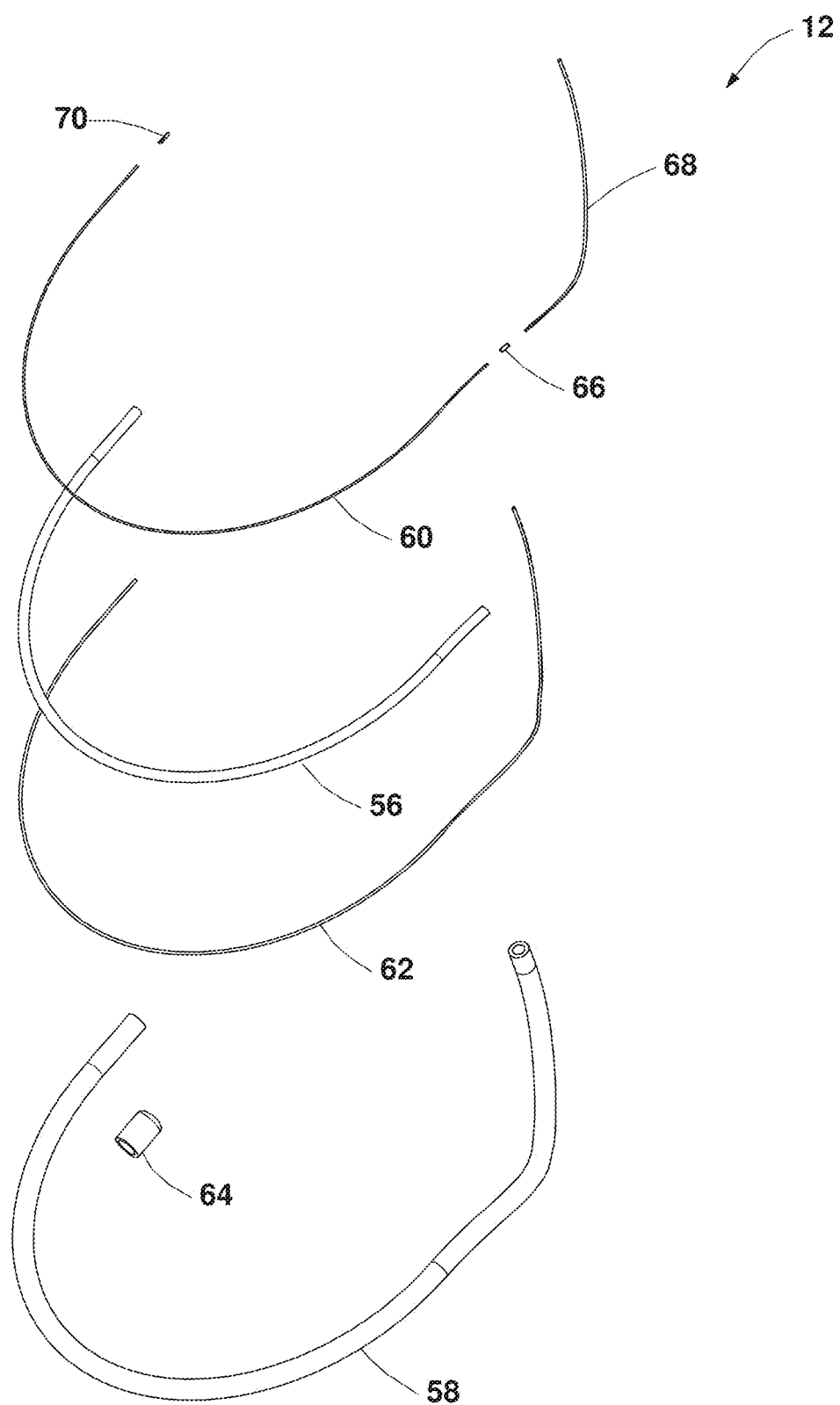
FIG. 7 is an exploded front perspective view from above of the heater assembly corresponding with the view taken in FIG. 1.

FIG. 7 illustrates in exploded perspective view components of heater assembly 12 of FIGS. 1-6. A U-shaped segment of Nichrome resistance heating wire 60 is inserted within inner PTFE tube 56 which is further inserted into a bottom curved portion of outer tube 58. A distal end of Nichrome wire 60 is electrically coupled with a solder bead 70 to a distal end of an insulated copper ground wire 62 that follows an outer surface of inner tube 56. An insulated copper power supply wire 68 is electrically affixed with a solder bead 66 onto a proximal end of Nichrome resistance heating wire 60. A heat-resistant PTFE end plug 64 electrically isolates a distal end of outer tube 58.

According to one construction, wire 66 is a coaxial inner Nichrome, or nickel chromium wire segment commercially available as Nichrome 60, available from MOR ELECTRIC HEATING ASSOC., INC, 5880 Alpine Ave. NW, Comstock Park, MI 49321 United States.

According to one construction, inner tube 56 is a PTFE extruded tube having an outer diameter and an inner diameter available from Zeus Inc. Headquarters., 620 Magnolia Street, Orangeburg, SC 29115 United States.

According to one construction, outer tube 58 is a PTFE extruded tube having an 0.35" outer diameter and an 5/16" inner diameter available from Zeus Inc. Headquarters., 620 Magnolia Street, Orangeburg, SC 29115 United States. Other high temperature plastics, composites, and/or metals can also be used for outer tube 58 in the various embodiments disclosed herein.

Figure 8:
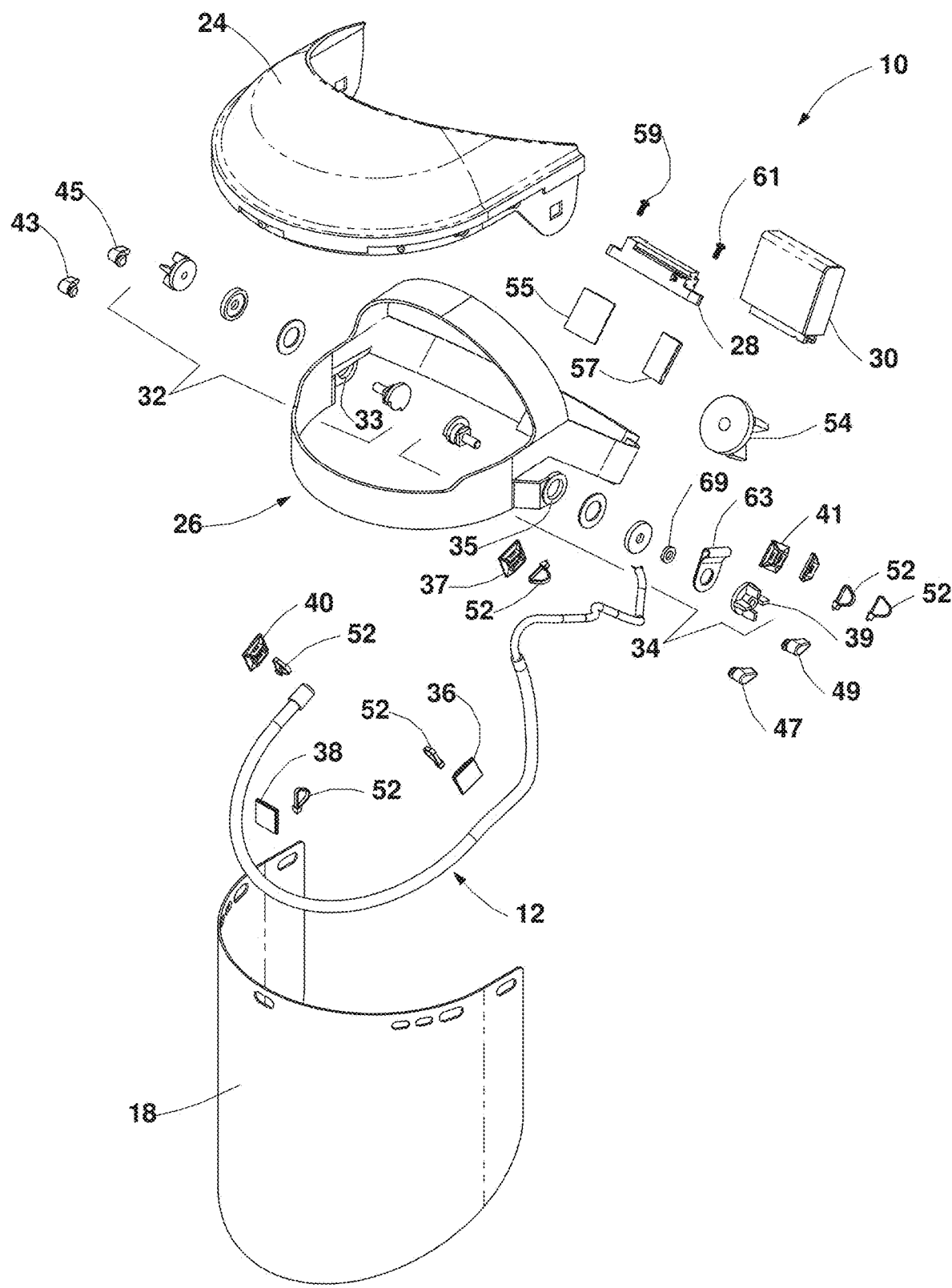
FIG. 8 is a front exploded perspective view from above of the heated face shield of FIGS. 1-6.

FIG. 8 illustrates details in exploded view of heated face shield 10. Heater assembly 12 is affixed along a bottom edge of face shield lens 18 with three spaced apart adhesive tape mounting brackets 36, 38 and 40. Additionally, adhesive tape mounting brackets 37 and 41, and pivot bracket 63 affix an upper portion of heater assembly 12 onto head band frame 26. One suitable mounting bracket 36, 37, 38, 39, 40 and 41 is a Panduit adhesive backed cable tie mount, Part No. ABM1M-A-C, available from Panduit Corp., Panduit Worldwide Headquarters, Tinley Park, 18900 Panduit Drive, Tinley Park, IL. 60487. Individual Nylon or plastic Panduit Corp. cable ties 52 pass through holes in brackets 36, 37, 38, 39, 40 and 41 to secure heater assembly 12 onto heated face mask 10. Other similar suitable adhesive or fastener affixed mounting brackets and retainers, or ties can also be used.

Wing nut friction fastener assemblies 32 and 34 of FIG. 8 are provided on opposite side edges of lens 18 and crown 24 to pivotally affix crown 24 and lens 18 onto cylindrical apertures 33 and 35 in head band frame 26 for retention at desirable rotated positions. Fastener assembly 34 also includes an inserted heater mounting bracket 63 pivotally carried about an inner concentric pivot washer 69 that is sandwiched between stacked components of fastener assembly 34 and which can be tightened by tightening fastener assembly 34.

Nylon turn buttons 43, 45, 47 and 49 in FIG. 8 each have a keyway post that is received in respective keyway slots in the front edge of crown 24 used to affix lens 18 onto a front edge of crown by rotating and locking each button into each keyway slot. Such feature allows for removal and replacement of lens 18 and heater assembly 12.

A headband rachet rotary driver 54 is affixed on a central back portion of head band frame 26, as shown in FIG. 8. A pair of plastic mounting blocks 55 and 57 are adhesively affixed onto opposed sides of rotary driver 54. Each mounting block has a vertical threaded bore positioned to receive a respective threaded fastener, or machine screw 59 and 61 to mount battery pack receiver, or mount 28 onto blocks 55 and 57 on head band frame 26. A rechargeable battery pack 30 is removably affixed atop mount 28 where an electrical connection is also made to supply power from battery pack 30 to heater assembly 12.

Figure 9:
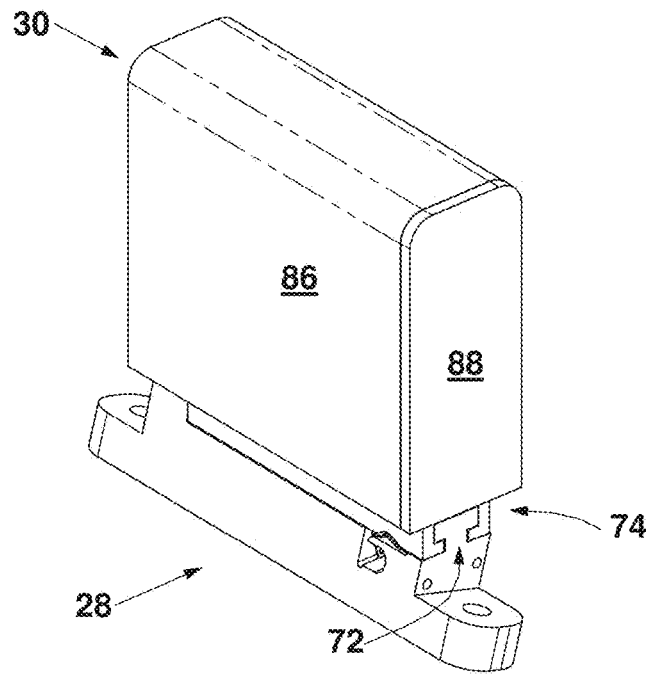
FIG. 9 is a perspective view of the battery pack and battery pack receiver for the heated face shield of FIGS. 1-6.
Figure 10:
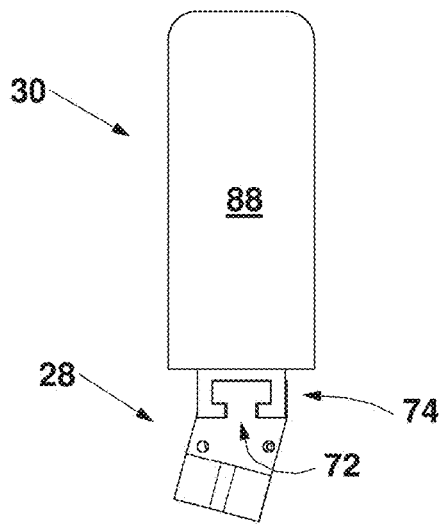
FIG. 10 is a right-side view of the battery pack and battery pack receiver of FIG. 9.

FIG. 9 is a perspective view from above of battery pack receiver 28 and battery pack 30 assembly together in both mechanical and electrically connected relationship. Battery pack 30 includes an outer plastic battery case 86 and a sealed end cap 88 affixed to an open end of battery case 86 with adhesive or ultrasonically welded. A receiving slot 74 on case 86 interlocks electrically and mechanically with a receiving T-rail 72 that engages in complementary interlocking relation with slot 74, as shown in FIGS. 9 and 10. With end cap 88 shown in end view, housing 30 is shown in FIG. 10 axially received in supported and interlocked relation onto receiver 28 with T-shaped rail 72 mated in axial relation within complementary T-shaped receiver slot 74.

Figure 11:
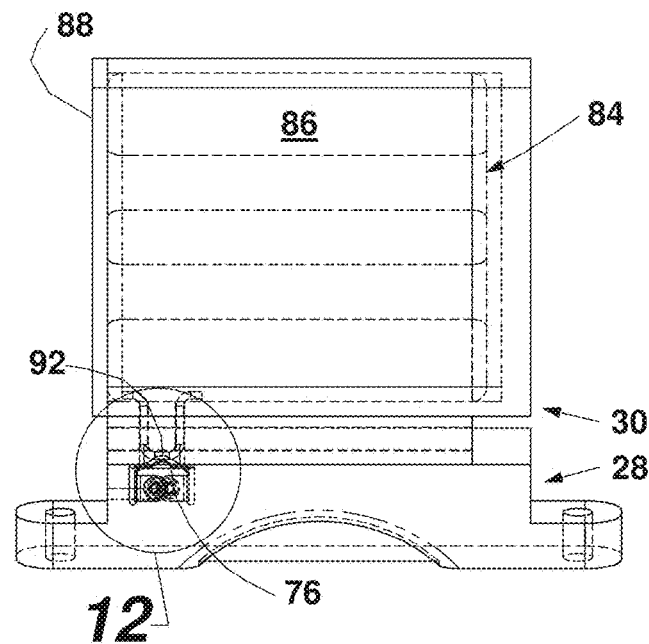
FIG. 11 is a front vertical view of the battery pack and battery pack receiver of FIG. 10.

FIG. 11 shows battery pack 30 physically affixed onto receiver 28 in electrically conductive relation. More particularly, a three cell battery pack 84 is encased between case 86 and end cap 88 and electrically coupled with conductive U-shaped contacts, such as contact 92. As shown, conductive U-shaped clip 92 is mated in electrically conductive contact with a complementary electrically conductive spring steel contact member 76.

Figure 12:
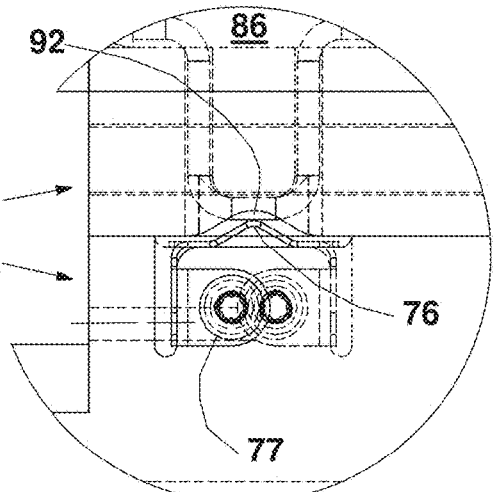
FIG. 12 is an enlarged view of the battery latch spring of FIG. 11 taken from the encircled region 12 of FIG. 11.

FIG. 12 illustrates in enlarged view electrical contact details showing engagement of electrical contact member 76 with conductive clip 92 while battery pack 28 is fully received in mated engagement with receiver 28. An electrically conductive steel fastener, or machine screw 77 mounts electrical contact member 76 within a complementary receptacle in receiver 28. Internal insulated conductive wires affix to each contact member 76 and 80 (see FIG. 14) and run through passages in receiver 28 to deliver a supply of power provided within case 86.

Figure 13:
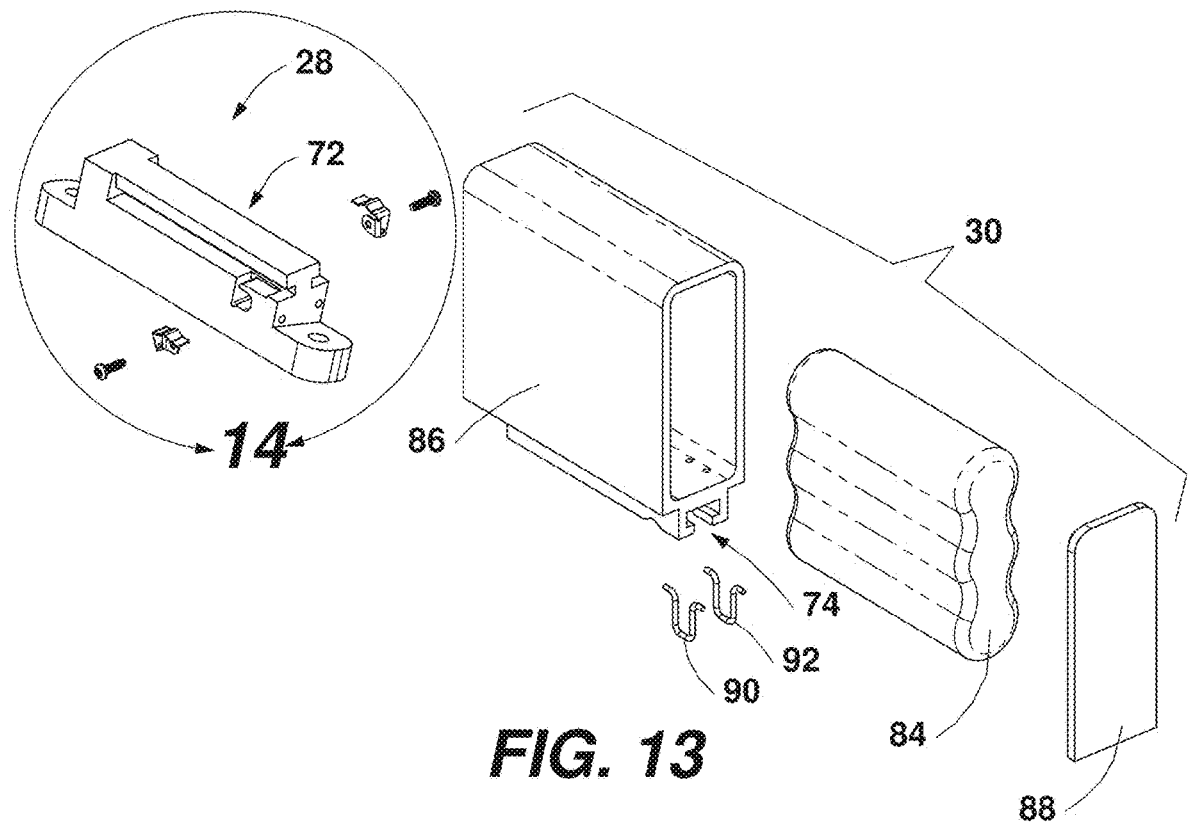
FIG. 13 is an exploded perspective view of the battery pack and battery pack receiver of FIGS. 1-6 and 9-12.

FIG. 13 is an exploded perspective view from above of receiver 28 and battery pack 30. A shrink-wrapped array 84 of battery cells are encased in a plastic housing formed from case 86 and end cap 88. Conductive wire clips 90 and 92 are passed through pairs of bores 91 and 93 in a bottom portion of case 86 and the ends are bent to entrap each clip 90 and 92. Cells of battery array 84 are electrically connected via a connector or solder (not shown) to each clip 90 and 92. Clips 90 and 92 extend downward outboard of receiver slot 74 to engage with contacts 80 and 76 outboard of rail 72 on battery pack receiver 28.

Figure 14:
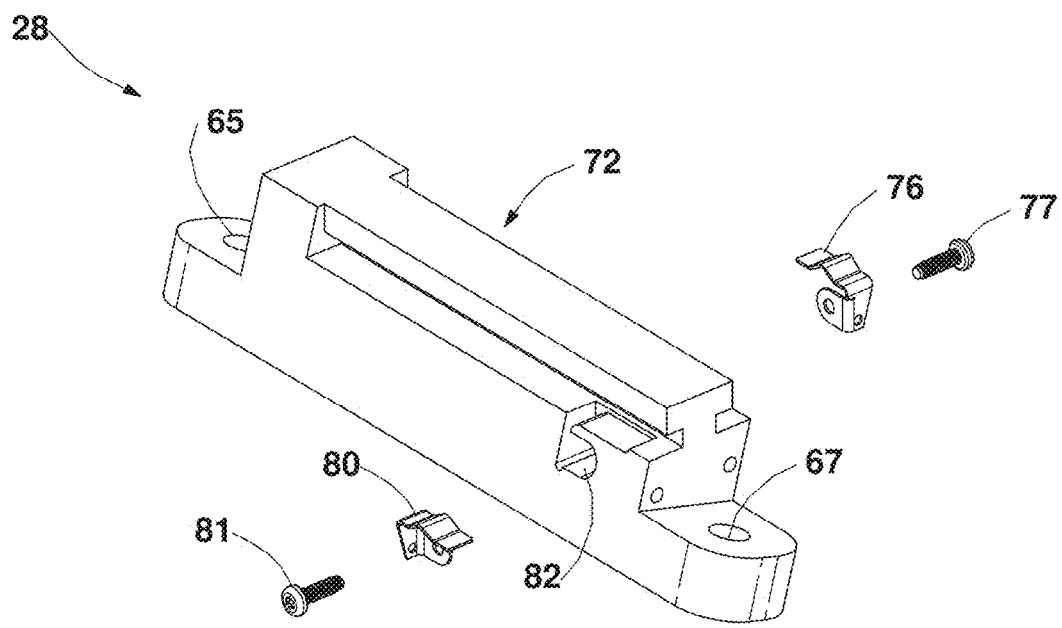
FIG. 14 is an exploded perspective view of the battery pack receiver of FIGS. 1-6 and 9-13.

FIG. 14 is an enlarged perspective view of battery pack receiver 28 showing assembly of each electrical contact 76 and 80 into in individual recesses, such as recess 82 in receiver 28, using threaded fasteners 77 and 81, respectively, that engaged with threaded bores in the bottom of each recess, such as recess 82 in receiver 28. According to one construction, receiver 28 is made from a non-electrically conductive material, such as a plastic or filled plastic. A pair of mounting bores 65 and 67 are provided one at each end of rail 72, configured to enable securement of receiver 28 onto blocks 55 and 57 (see FIG. 8) with a pair of threaded fasteners, or bolts (not shown).

Figure 15:
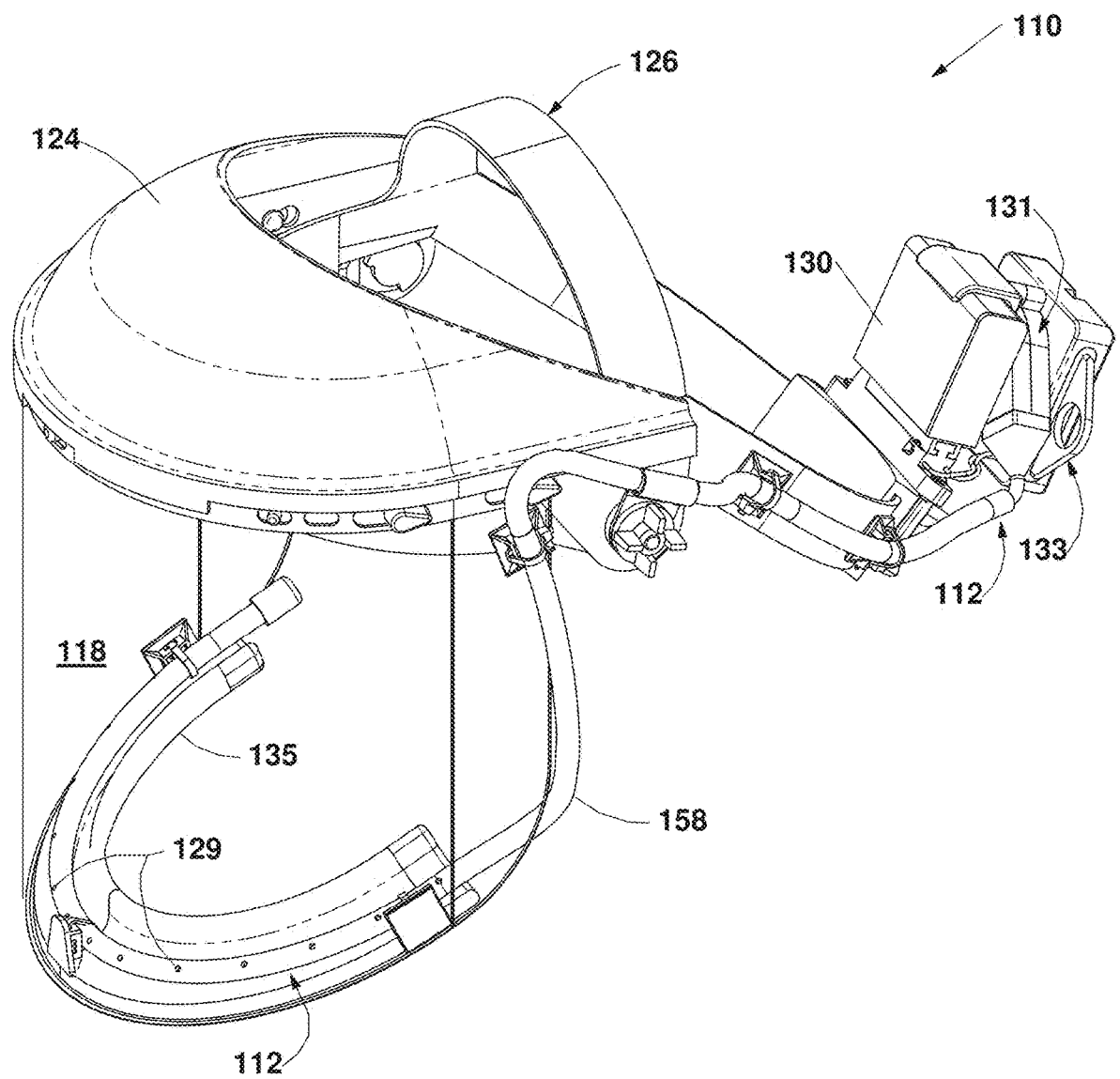
FIG. 15 is a front perspective view from above of an alternate heated face shield with a heater and a portable filtered forced air source.

FIG. 15 is a front perspective view from above of an alternate heated face shield 110 with a heated and forced air heater assembly 112 including a portable filtered forced air source comprising a centrifugal fan 131 and a pre-filter 133. Heater assembly 112 includes an arcuate heated segment of PTFE tube 158 extending along a bottom edge of lens 118 and having an array of spaced-apart air flow ports 129 that deliver a source of air from fan 131 to impinge on an inner surface of lens 118. Visor, or crown 124 is affixed to a front end of head band frame 126, while battery 130 is affixed to a rear end of frame 126. An air flow bottom edge baffle, or skirt 135 is provided along a bottom edge of lens 118 beneath a heated elongate portion of heater assembly 112 in order to prevent or reduce convective air flow from beneath a bottom edge of lens 118 which might otherwise draw air from in front of lens 118. Such mitigation of air flow is desirable particularly when face mask shield 110 is being used in an environment where there exists a risk of virus transmission or contaminant delivery to a user.

Figure 16:
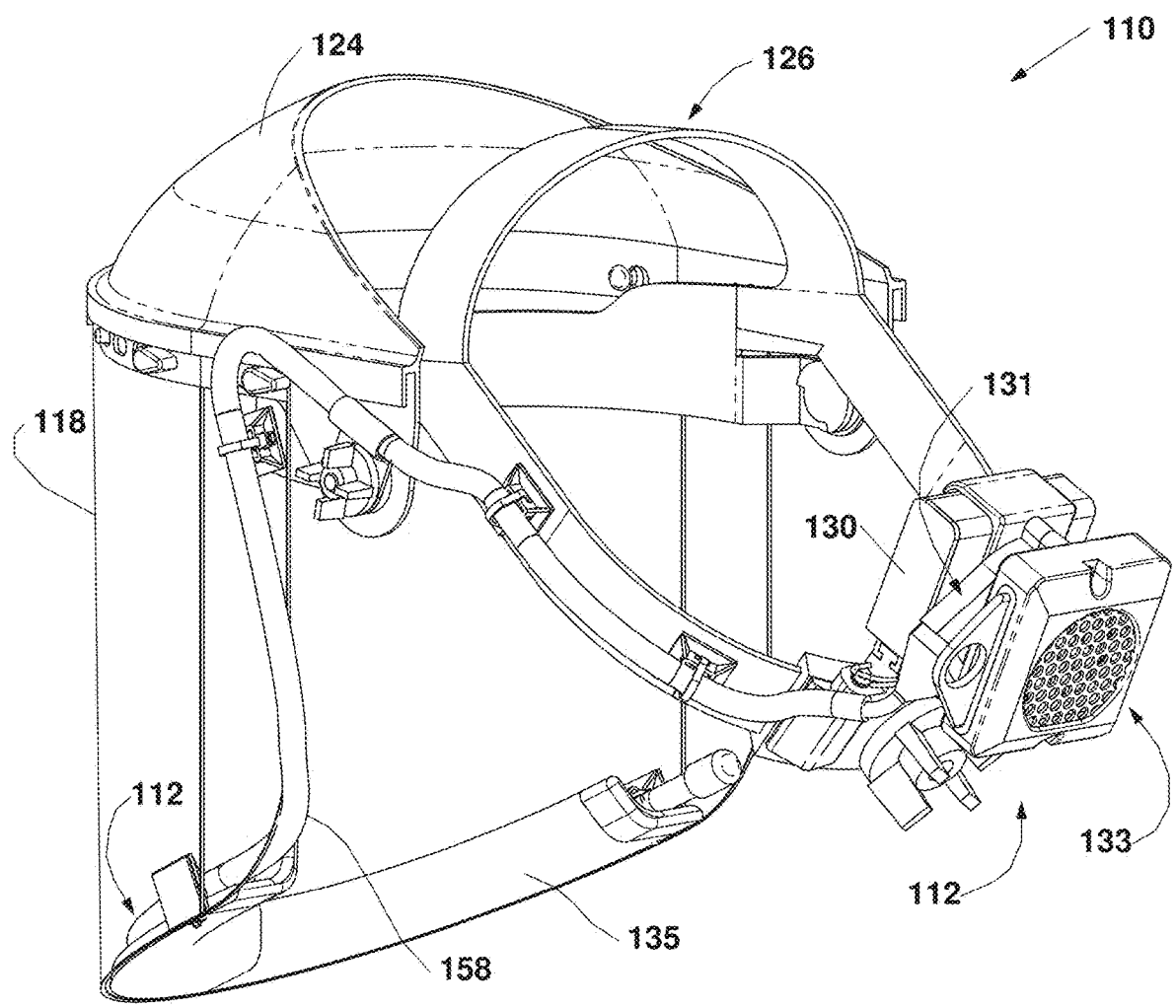
FIG. 16 is a rear perspective view from behind of the heated face shield of FIG. 15.

FIG. 16 is a rear perspective view from behind of the heated face shield 110 of FIG. 15 further illustrating the crown 124, battery 130, fan 131 and filter 133 affixed onto head band frame 126. PTFE tube 158 is configured to deliver heated air via forced air heater assembly 112 along a bottom edge of lens 118 above skirt 135 from an electrical heater source provided by battery 130, an air flow source provided by fan 131, and a filtered source of air provided by filter 133, such as a pleated HEPA or ULPA air filter. Tube 158 can have an inner Nichrome heating wire provided in a smaller PTFE tube, similar to the construction shown in version depicted in FIGS. 1-14, as shown in greater detail in FIG. 20 below. Furthermore, a heater control switch, or circuit can be provided on heater system 112 including a bimetallic switch, a thermistor, or some other power control device that operates off of detected temperature thresholds to turn off a power to the heater, or Nichrome wire when a threshold temperature is reached.

Figure 17:
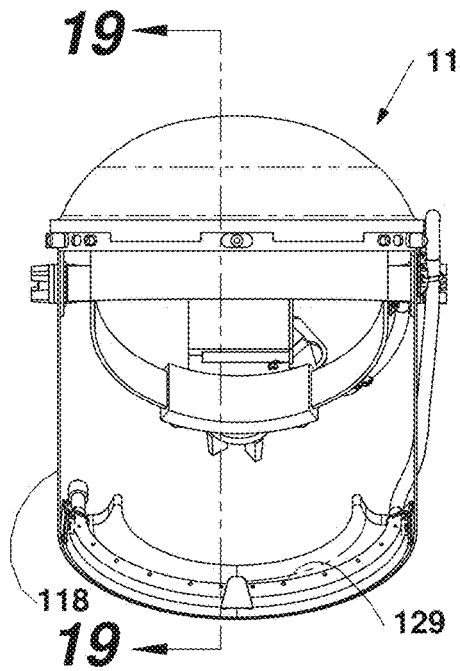
FIG. 17 is a front view of the face shield of FIGS. 15-16.

FIG. 17 is a front view of the forced air heated face shield 110 of FIGS. 15-16. A plurality of equally spaced-apart air holes, or vents 129 deliver a flow of heated air to an inner lower surface of lens 118.

Figure 18:
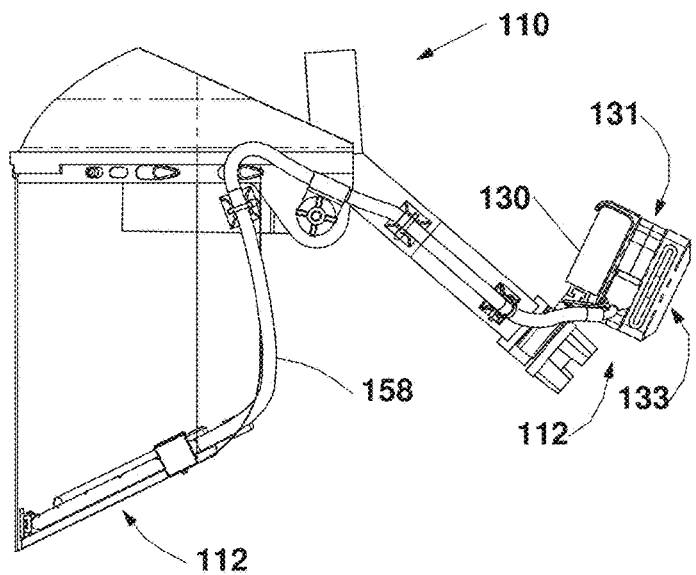
FIG. 18 is a right-side view of the face shield of FIG. 17.

FIG. 18 is a right-side view of the face shield 110 of FIG. 17 illustrating details of heater assembly 112 with PTFE tube 158, battery pack 130, fan 131 and filter 133.

Figure 19:
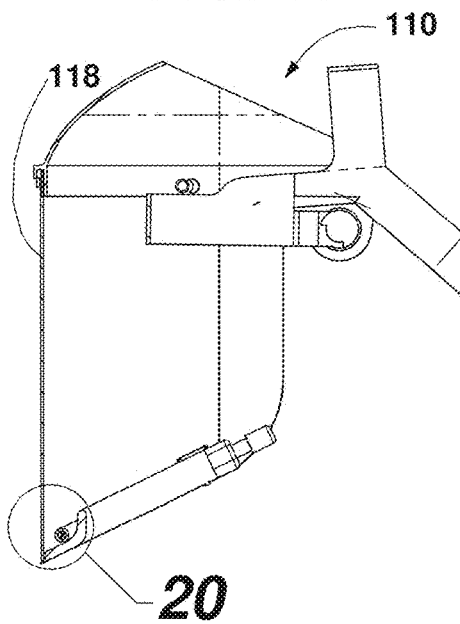
FIG. 19 is a vertical sectional view of the face shield taken along line 19-19 of FIG. 17.

FIG. 19 is a vertical sectional view of the face shield 110 taken along line 19-19 of FIG. 17 showing lens 118 in centerline section.

Figure 20:
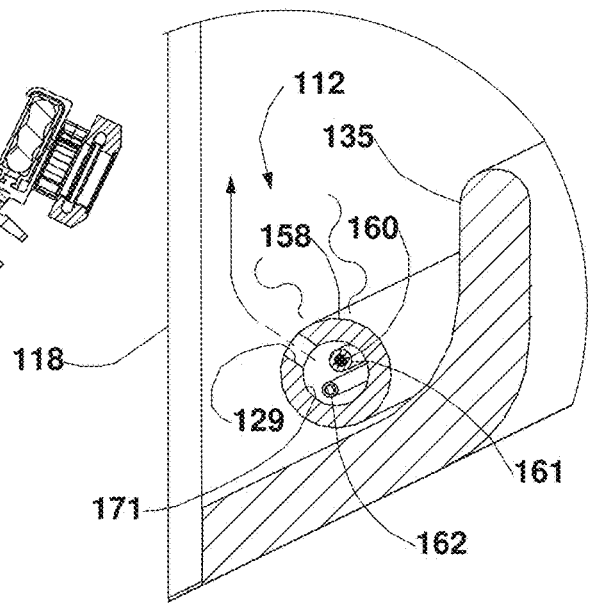
FIG. 20 is an enlarged view of the forced air heater assembly and lens taken from the encircled region 20 of FIG. 19.

FIG. 20 is an enlarged view of the heater assembly 112 and lens 118 taken from the encircled region 20 of FIG. 19. PTFE tube 158 has an inner bore 171 in fluid communication with a plurality of outlet ports, or bores 129 and is provided between lens 118 and skirt 135 which has an upturned end flange. A Nichrome heater wire 160 is provided in a smaller PTFE tube 161 inside of bore 171. A return insulated ground wire 162 is also provided in bore 171. A remaining open portion of bore 171 provides an airflow path for clean air that exits via ports 129 to impinge on an inner surface of lens 118.

Figure 21:
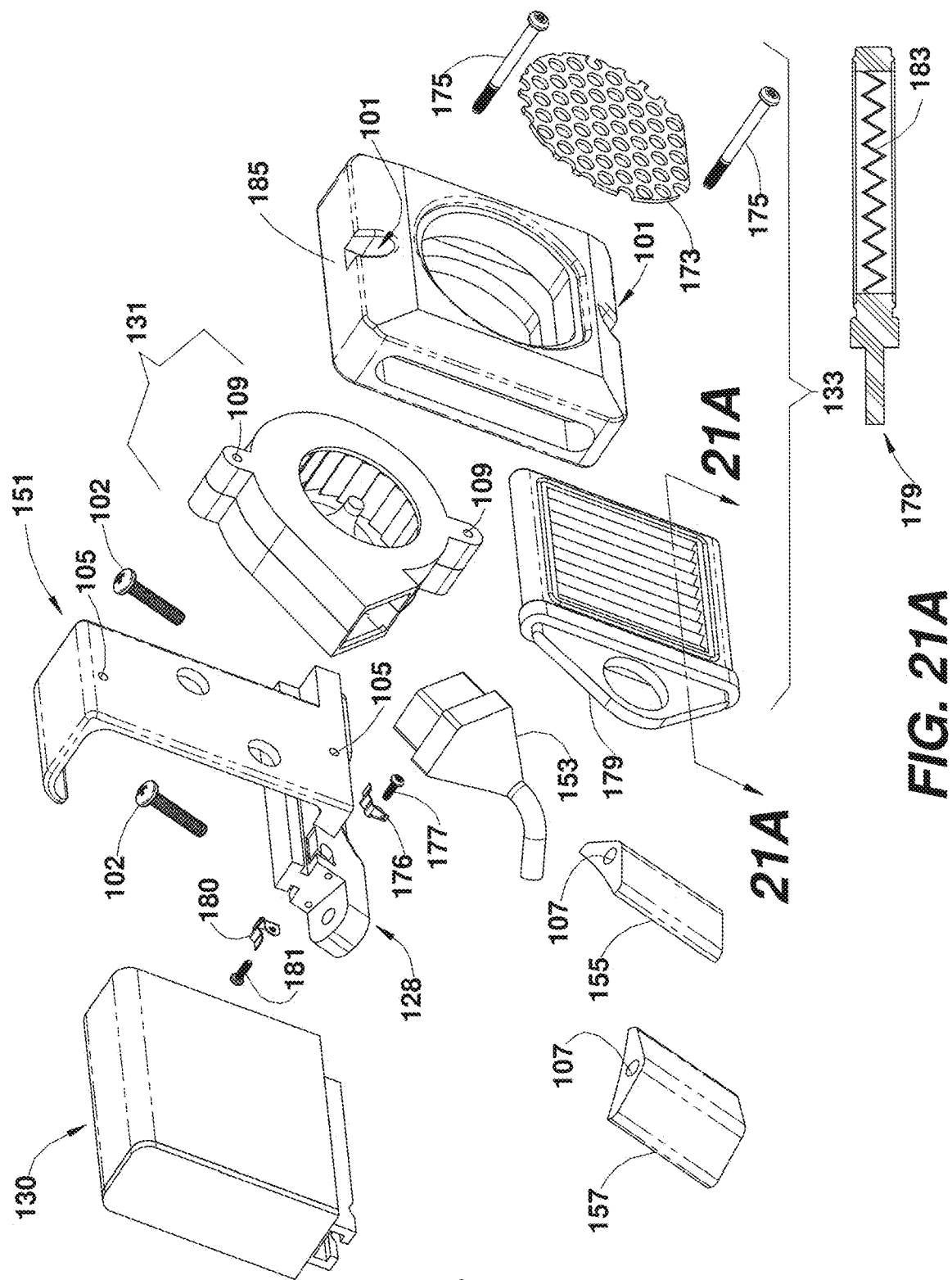
FIG. 21 is an exploded perspective view of the portable filtered forced air source of FIGS. 15-20.

FIG. 21 is an exploded perspective view of the portable filtered forced air source of FIGS. 15-20 comprising battery pack 130, fan/filter carrier 151, centrifugal fan 131, and filter assembly 133. Carrier 151 and receiver 128 are integrally formed from a single piece of plastic material. Optionally, carrier 151 is affixed with threaded fasteners to threaded complementary bores provided in battery pack receiver 128.

Threaded fasteners, or bolts 102 of FIG. 21 are used to secure receiver 128 to mounting blocks 155 and 157 within complementary threaded bores 107. Mounting blocks 155 and 157 are affixed to the head band frame (not shown) with adhesive or fasteners (not shown). Spring latch electrical contacts 176 and 180 are affixed with threaded fasteners 177 and 181 to receiver 128. A tapering or narrowing plenum, or collector 153 is affixed to an outlet end of centrifugal fan 131 and has an outlet tube configured to mate with tube 158 (see FIG. 16). Filter assembly 133 and fan 131 are affixed to a back surface of bracket 151 with a pair of threaded fasteners, or bolts 175 that each pass through clearance through-bores 101 and 109 and into threaded bores 105. Bores 101 are provided in housing frame 185 of filter assembly 131. Accordingly, fan 131 and filter assembly 133 are affixed to and carried by housing frame 185 sealed around an outer periphery with housing frame 185.

According to one construction, one suitable form of centrifugal fan 131 is a Model No. B5015M fan, or DC blower available from Mechatronics, Inc., 8152-304th Ave. SE, PO Box 5012, Preston, WA 98050-5012. USA. However, other pressurized air sources are also possible, such as compressed air sources or other forms of fans and forced clean air sources.

FIG. 21A is a transverse sectional view of the air filter assembly 179 taken along section 21A-21A of FIG. 21 and showing the folded, or pleated HEPA or ULPA air filter 183. Other suitable filters can also be used. According to one construction, filter 183 is encased along an outer periphery with a soft rubber or silicon outer edge frame that seats and seals with an inner periphery of housing frame 185.

Figure 22:
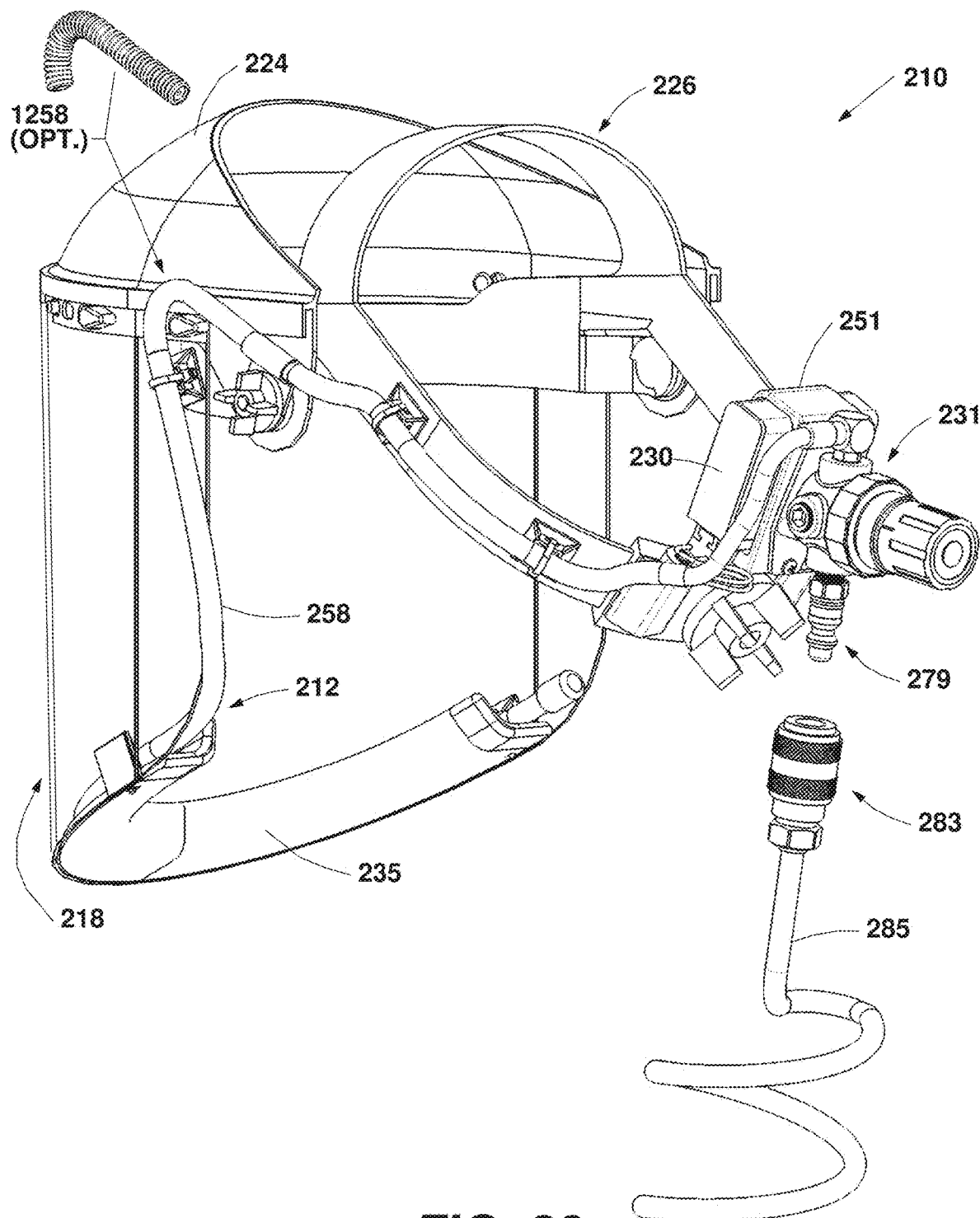
FIG. 22 is a rear perspective view of a further alternate heated and air ventilated face shield with an external clean air source, such as a hospital air source or a biologic research lab air source in the form of an external forced air source regulator assembly over that shown in FIG. 15, but having an external filtered air source, such as a wall-mounted building filtered air source found in a hospital or laboratory environment.

FIG. 22 is a rear perspective view of a further alternate heated and clean air ventilated face shield 210 with a heated wire and forced clean air source, or assembly 212 and a portable filtered external forced air source regulator assembly 231 over that shown in FIG. 15, but having an external filtered air source, such as a wall-mounted building filtered air source found in a hospital or laboratory environment delivered via a coiled, retractable pressure air-line 285 via a releasable pneumatic coupling 283 that releasably mates with a complementary male pneumatic coupling member 279. PTFE tube 258 has a Nichrome heating wire, or heat source, and clears moisture from lens 218 using a flow of heated clean air from an external filter pressurized air source delivered via pneumatic line 285 to regulator 231 for delivery to tube 258 to apertures 229 (see FIG. 24). Regulator 231 is affixed to a rear of bracket 251 on head band frame 226. Optionally, a Nichrome (or nickel chromium) heating wire (such as wire 160 of FIG. 20) can also be provided with outside air to deliver heat and airflow to clear an inner surface of lens 218. Heated wire assembly 161 and insulated ground wire 262 are electrically coupled with battery pack 230 and enter metal tube 295 (see FIG. 23) and extend into tube 258 where a segment of wire assembly 261 comprises a Nichrome wire section extending along a bottom edge of lens 218. Optionally, battery pack 230 and wires 261 and 262 can be eliminated from assembly 212, as shown in FIG. 24 to provide a face shield that clears an inner surface of lens 218 with a flow of filtered outside air from hose 285 emanating from tube 258 along skirt 235. Tube 258 forms a bend where crown 224 and lens 218 pivot on head band frame 226. Optionally, tube 258 can be formed from smooth PTFE tubing with a medial portion formed from corrugated PTFE tubing 1258 in the region of the bend near the pivot point.

Figure 23:
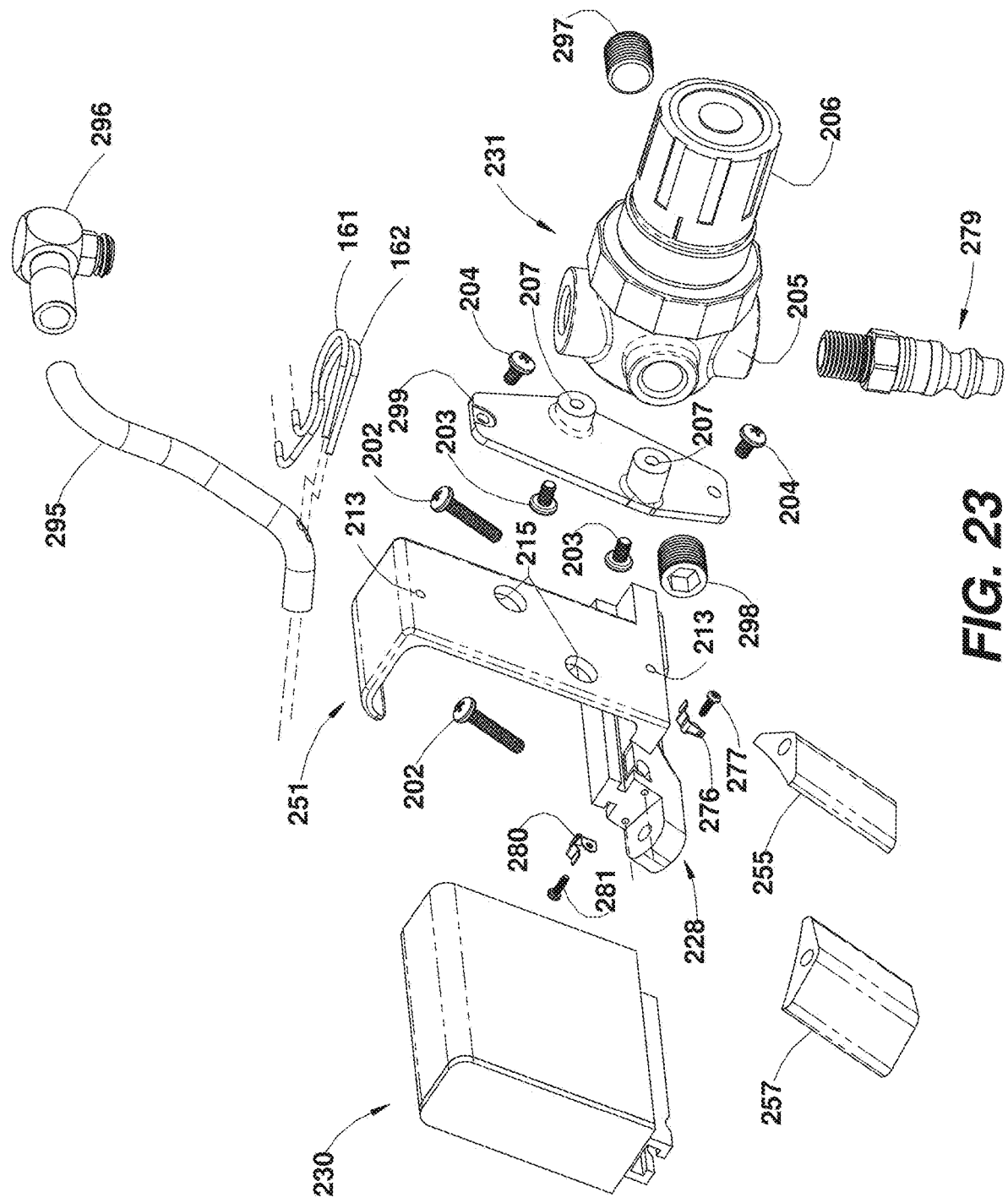
FIG. 23 is an exploded perspective view of the portable heated and filtered external forced air source regulator assembly of FIG. 22.
Figure 24:
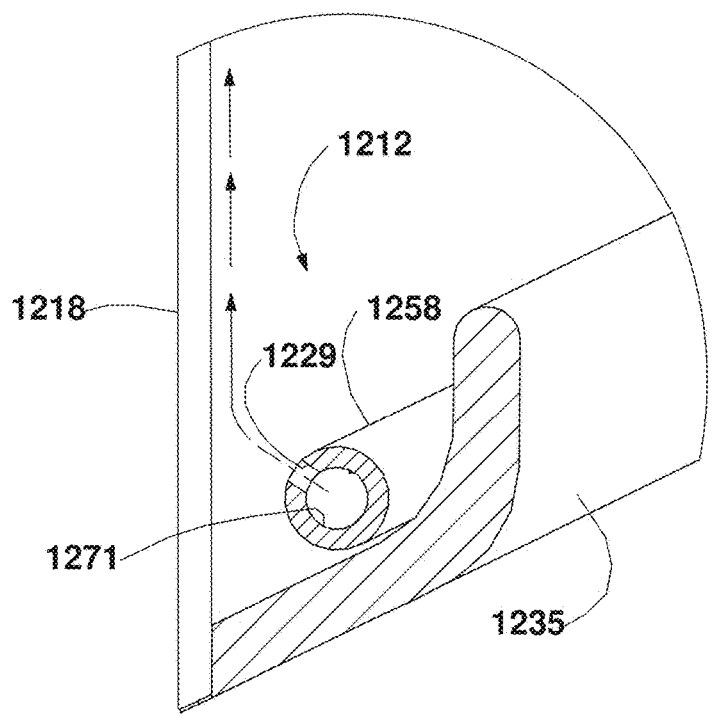
FIG. 24 is an enlarged view of an optional construction forced air lens cleaner for the mask of FIGS. 22-23 taken from an encircled region corresponding with the encircled region 20 of FIG. 19, but for the face shield of FIGS. 22-23.

FIG. 23 is an exploded perspective view of the portable heated and filtered external forced air source regulator assembly 212 of FIG. 22. Regulator 231 is affixed to mounting plate 299 with threaded fasteners 203 that pass through bosses 207 and thread into corresponding bores (not shown) in the bottom of housing body 205 of regulator 231. Clearance bores 215 are provided in battery bracket 251 to provide clearance for the heads on fasteners 203. Threaded plugs, or set screws 297 and 298 are received in extra ports on body 205 and threaded elbow pneumatic pressure fitting, or push-to-connect 90 degree elbow adapter 296 having a tube-receiving port and a threaded inlet and directs regulated reduced pressure clean air into fitted metal pipe 295 where it is delivered into tube 258 (see FIG. 22) and affixed with a tight and sealed insert fit within tube 258. Regulator 231 is affixed to plate 299 via fasteners 204 which pass through bores 217 into threaded bores 213 in battery bracket 251.

One suitable form of regulator 231 in FIG. 23 is commercially available from ControlAir, Type 850 Series miniature air pressure regulator, available from ControlAir, International HQ, 8 Columbia Drive, Amherst, NH. 03031.

A rotary adjustment knob 206 enables adjustment of the outlet air pressure delivered by regulator 231 to line 295. Other forms of regulators can also be used to reduce line pressure from the source. Typical medical air is delivered to rooms at 50-65 psi and needs to be reduced before delivery to the face mask shield. A hose coupling plug 279 is threaded into a bottom threaded bore (not shown) in body 205 to supply pressurized air to regulator 231 from complementary pneumatic coupling 283 (see FIG. 22).

As shown in FIG. 23, battery bracket 251 is affixed to head band frame 226 (see FIG. 22) using a pair of threaded fasteners 202 that pass through bores, such as bore 267 in receiver 228 and into threaded bores 207 provided in each block 255 and 257 which are affixed to such head band frame using foam adhesive pads (not shown). Wires 261 and 262 extend from tube 295 and into bores 295 and 297 in receiver 228 to electrically couple with electrical contacts 280 and 276 such as with solder joints (not shown). Contacts 276 and 280 are each affixed into complementary recesses in receiver 228 with threaded fasteners 277 and 281. Battery pack 230 is then slid onto receiver 228.

FIG. 24 is an enlarged view of an optional construction forced air lens cleaner assembly 1212 for the mask of FIGS. 22-23 taken from an encircled region corresponding with a view of the encircled region 20 of FIG. 19, but for the face shield of FIGS. 22-23 and omitting provision of any heating wire. More particularly, PTFE tube 1258 includes an inner bore 1271 that feeds filtered, clean air via a plurality of outlet ports, or bores 1229 configured to direct clearing air flow onto an inner surface of lens 1218 to clear and prevent accumulation of moisture on such surface. Optionally, any form of tube can be used for tube 1258 including lower temperature plastic tubes because there is no heat source on face shield 1210. Upturned skirt 1235 isolates tube 1228 proximate lens 1218 and reduces induced air flow from in front of lens 1218 due to air flow from ports 1229.

Figure 25:
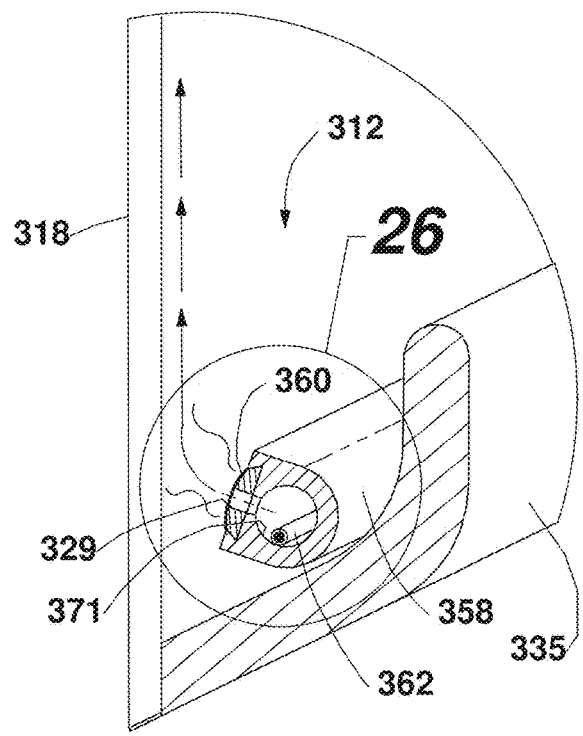
FIG. 25 is an enlarged view of a second optional construction forced air heater assembly and lens for the mask of FIGS. 22-23 taken from an encircled region corresponding with the encircled region 20 of FIG. 19, but for the face shield of FIGS. 22-23.

FIG. 25 is an enlarged view of a second optional construction heated and forced air heater assembly 312 and lens 318 for the mask of FIGS. 22-23 taken from an encircled region corresponding with a view of the encircled region 20, but for the face shield of FIGS. 22-23. More particularly, PTFE tube 358 comprises a D-shaped cross section tube having a recessed flat face configured to receive an indium tin oxide layer 360 deposited, such as by vapor deposition, on an outer surface of a strip of printed circuit board substrate that is inserted within the recessed flat face of tube 358. Layer 360 generates heat when electricity is delivered across layer 360. A plurality of ports, or bores 329 further deliver forced clean air from interior bore 371 of tube 358 which further directs heat generated from layer 360 onto an inner surface of lens 318. An insulated ground wire, or copper ground wire 362 is also carried inside of interior bore 371 of tube 358. Upturned skirt 335 isolates tube 358 proximate lens 318 and mitigates induced convective air flow from in front of lens 318 that might otherwise draw contaminants and/or viral components behind lens 318.

Figure 26:
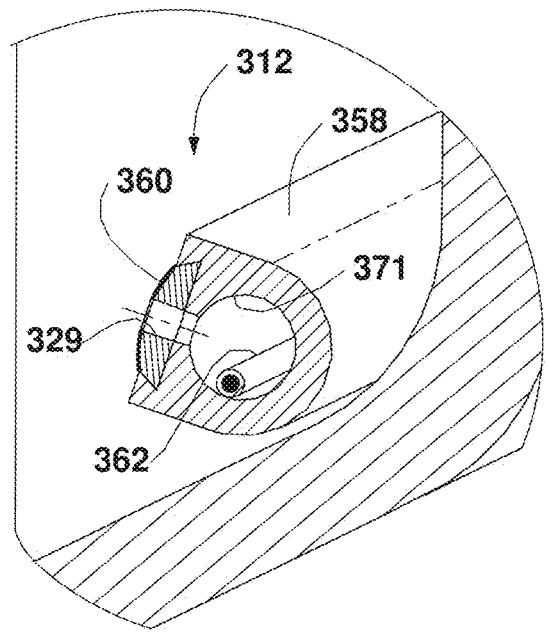
FIG. 26 is an enlarged sectional view of the forced air heater assembly of FIG. 25 taken from encircled region 26 of FIG. 25.

FIG. 26 is an enlarged sectional view of the forced air heater assembly 312 of FIG. 25 taken from encircled region 26 of FIG. 25. More particularly, indium tine oxide layer, or coating 360 is retained in a slot, or recess in tube 358. Filtered, clean air is delivered under pressure via bore 371 for delivery to a plurality of spaced-apart flow apertures 329 to further impart condensate mitigation or removal in combination with heat from layer 329. Insulated ground wire 362 is carried inside of bore 371 to complete an electrical power supply circuit with a battery pack on a face shield, as previously taught above to provide heated and force air heater assembly 312.

Figure 27:
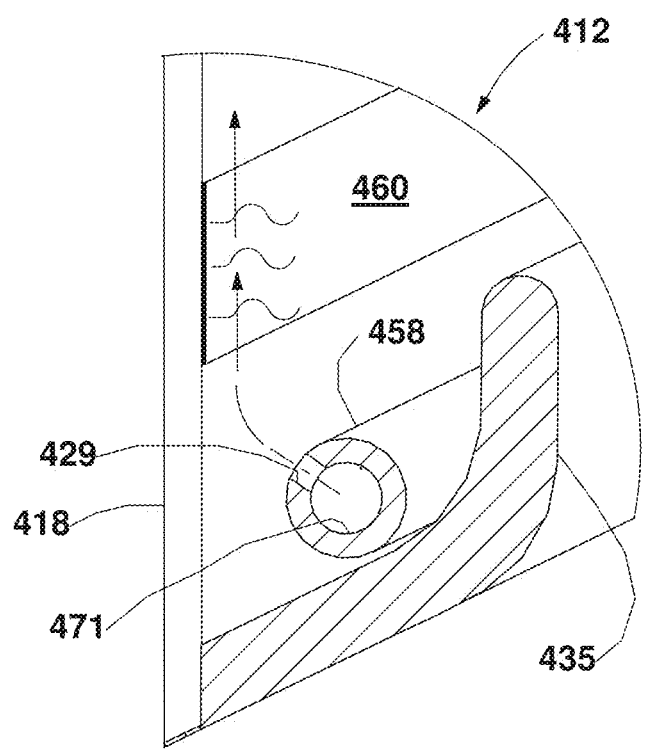
FIG. 27 is a third optional construction forced air heater assembly and lens for the mask of FIGS. 22-23 taken from an encircled region corresponding with the encircled region 20 of FIG. 19, but for the face shield of FIGS. 22-23.

FIG. 27 is a third optional construction forced air heater assembly 412 and lens for the mask of FIGS. 22-23 taken from an encircled region corresponding with the encircled region 20 of FIG. 19, but for the face shield of FIGS. 22-23. More particularly, a layer, or coating of indium tin oxide is deposited onto an inner surface of lens 418 of a face shield, such as a shield shown in prior disclosed versions above. In one case, lens 418 is a glass or high temperature plastic lens. PTFE tube 458 includes bore 471 configured to deliver filtered, clean air flow via plurality of bores 429 over and upward to an inner surface of lens 418 to enhance condensate mitigation and removal in combination with heat generated by layer 460. Upturned lip 435 further functions to isolate heat and airflow from tube 458 and layer 460 to minimize or eliminate convective airflow from occurring under a bottom edge of lens 418 that might otherwise draw contaminants from in front of lens 418 to a backside of lens 418 where a user might inhale such contaminants.

Figure 28:
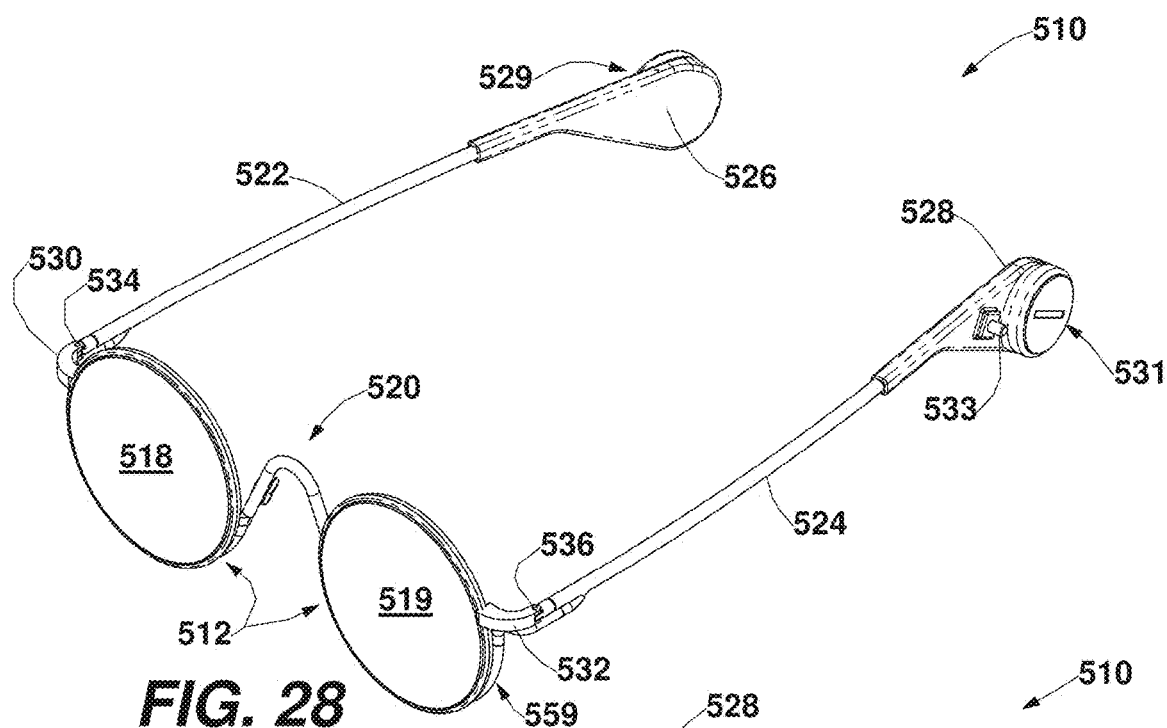
FIG. 28 is perspective view from in front and above of a pair of heated eyeglasses.

FIG. 28 is perspective view from in front and above of a pair of heated eyeglasses 510. Eyeglasses 510 include a heater assembly 512 that is integrally formed as a portion of a frame holding together eyeglasses 510. Bridge assembly 520 extends between lenses 518 and 519 and heater assembly 512 extends along a lower semi-cylindrical portion of each lens 518 and 519. Temple pieces, or temples 522 and 524 extend from hinges 534 and 536, respectively, affixed to end pieces 526 and 528. Temple tips 526 and 528 on each temple 522 and 524, respectively, each support a battery pack 529 and 531 configured to supply power to heater tubes along each lens 518 and 519, such as PTFE nichrome wire heater tube 559 on lens 519. Microswitch 533 is configured to turn on and off power from battery pack 531 to power heater 512 at heating portions 558 and 559.

Figure 29:
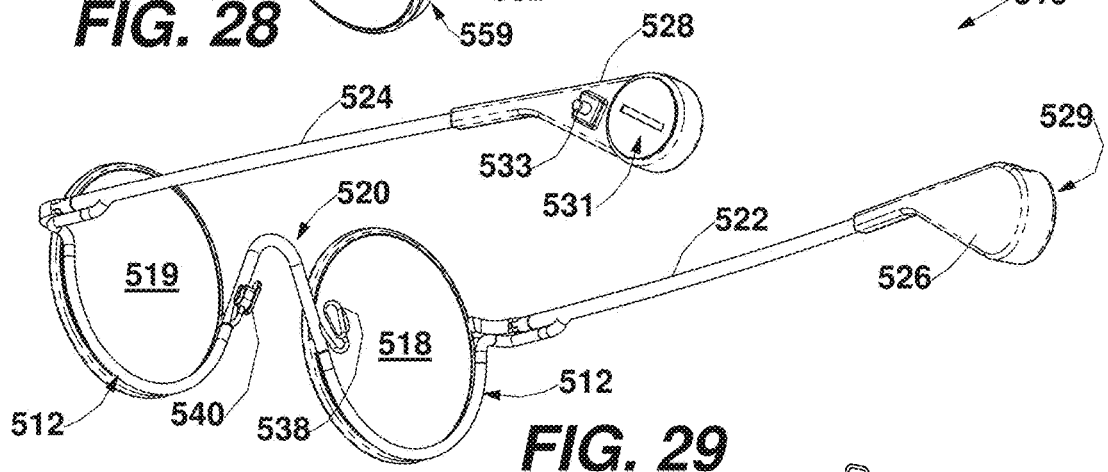
FIG. 29 is a perspective view from behind and below of the heated eyeglasses of FIG. 28.

FIG. 29 is a perspective view from behind and below of the heated eyeglasses 510 of FIG. 28 further illustrating the position of heater assembly 512 along each lower eye glass 518 and 519. Nose pad arms 538 and 540 are mounted to nose bridge assembly 520 and internal components of heater assembly 512 extend through a hollow tube of nose bridge assembly 520. Remaining portions of wiring for heater assembly 512 extend internally within a hollow portion of each bridge 522 and 524 and electrically connect with switches 532 (see FIG. 30) and 533 and battery packs 529 and 531 in temple end pieces 528 and 530. One suitable source of microswitch 533 is E-Switch Model No. TL3305 tactile switch available from DigiKey Electronics, 701 Brooks Ave. South, Thief River Falls, MN 56701.

Figure 30:
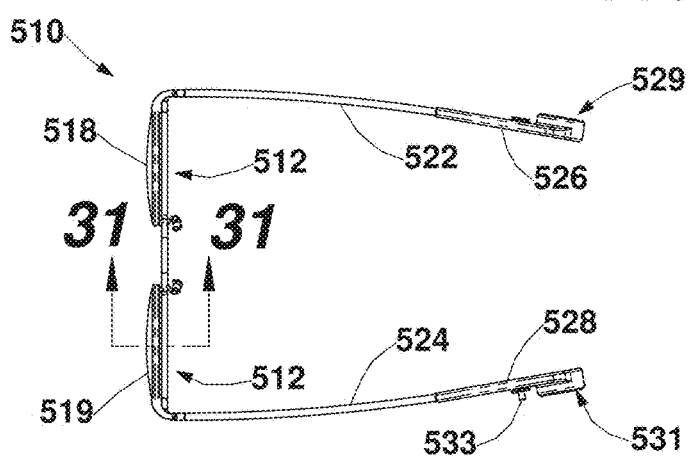
FIG. 30 is a plan view from above of the heated eyeglasses of FIGS. 28-29.

FIG. 30 is a plan view from above of the heated eyeglasses 510 of FIGS. 28-29. Switch 533 is shown on temple end piece 528 of temple 524 adjacent to and electrically coupled with battery pack 531. The resulting selectively activated electrical circuit is used to power heater assembly 512 on each side to mitigate condensate accumulation on lenses 518 and 519. Optionally, a timer can be provided with switch 533 that triggers operation of heat delivery for a predefined period of time. Further optionally, a switch can be provided on each temple end piece 526 and 528.

Figure 31:
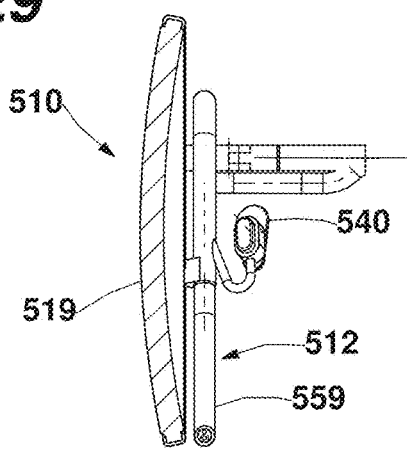
FIG. 31 is a vertical sectional view of the eyeglasses taken through line 31-31 of FIG. 30.

FIG. 31 is a vertical sectional view of the eyeglasses 510 taken through line 31-31 of FIG. 30. PTFE heater tube 559 of heater assembly 512 is shown configured to apply heat to a lower portion of lens 519 adjacent nose arm pad 540. Lens 519 can be either glass or plastic or some other suitable optically transmissive material.

Figures 32, 33:
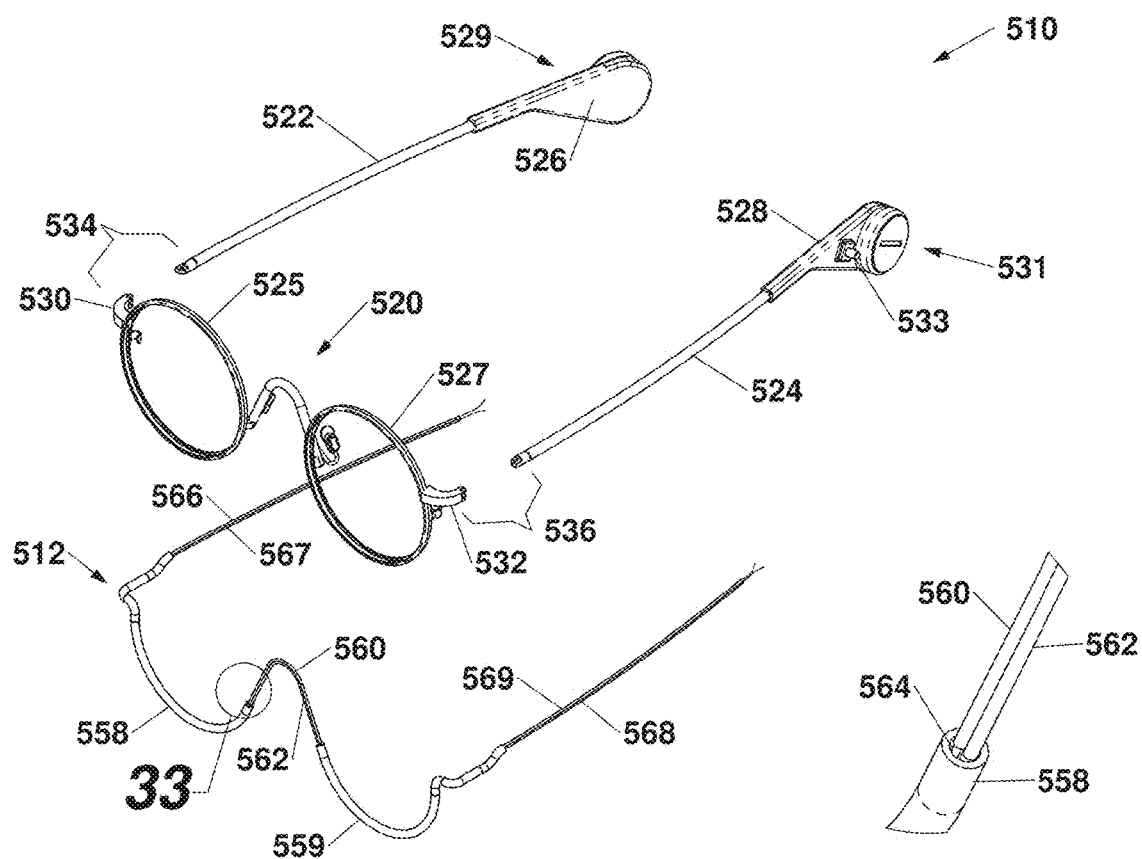
FIG. 32 is an exploded perspective view of the eyeglasses of FIG. 28.
FIG. 33 is an enlarged perspective view from the encircled region 33 of FIG. 32

FIG. 32 is an exploded perspective view of the eyeglasses 510 of FIG. 28 but omitting each Eyeglass lens. Heater assembly 512 comprises a pair of insulated conductive wires 566, 567 and 568, 569 on each side that insert into PTFE tubes 558 and 559. Wires 566 and 568 are conductive leads that are soldered to segments of Nichrome electrically resistive and heat dissipating wire in each tube 558 and 558, such as Nichrome wire 564 in tube 559 (see FIG. 33). Insulated wire 560 is soldered to each segment of Nichrome wire within heater tubes 558 and 559 in bridge 520. Insulated wires 567 and 569 are ground wires that extend through tubes 558 and 559 and are coupled with insulated wire 562 in the region of bridge 520.

According to one construction, bridge assembly 520 of FIG. 32 includes a tubular metal body that receives wires from heater assembly 512 and affixed, such as by soldering to Eyeglass frame members 525 and 527. Bridge assembly 520, frame members 525 and 527, hinges 534 and 536, and arms 530 and 532 are constructed from metal, or steel according to one construction. Temples 522 and 524 are hollow and have an extra hole for receiving tubes 558 and 559 and wires 566, 567 and 568, 569 where they pass internally to battery packs 529 and 531 and switch 533 on tips 526 and 528, respectively.

FIG. 33 is an enlarged perspective view from the encircled region 33 of FIG. 32 showing one heater tube 558 receiving an insulated ground wire 562 and an insulated power wire 560 that is soldered in-line with a nichrome resistance heating wire 564. Wire 564 passes through tube 558, and while subjected to current flow, imparts heat via lens 558 to an Eyeglass lens. Wire 564 is soldered in-line at an opposite end to insulated power wire 566.

Figure 34:
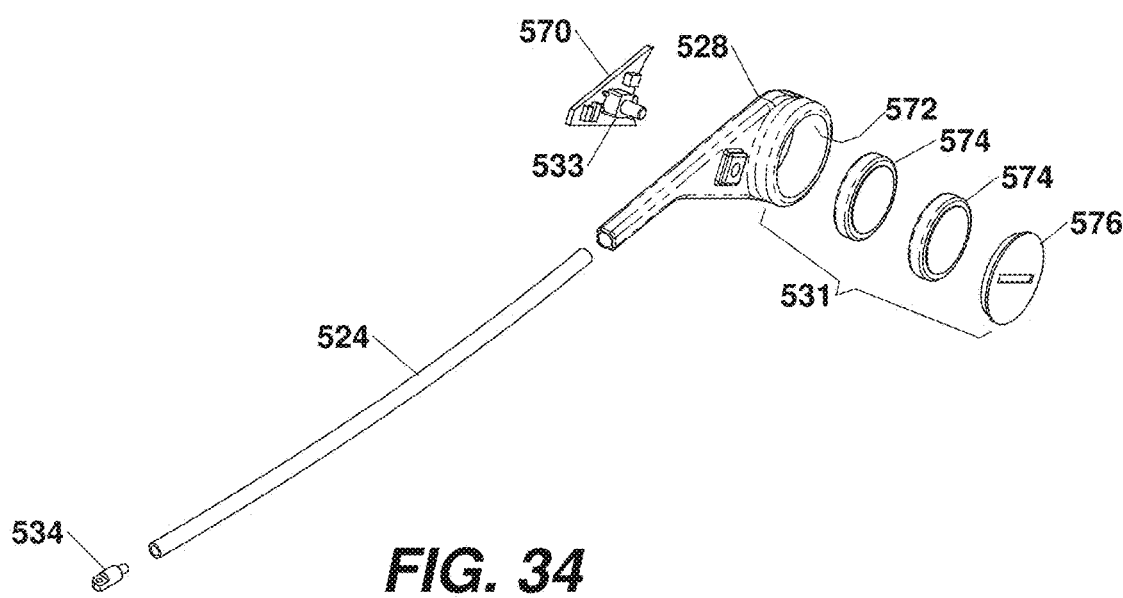
FIG. 34 is an exploded perspective view of the temple for the eyeglasses of FIGS. 28-32.

FIG. 34 is an exploded perspective view of the temple 524 for the eyeglasses of FIGS. 28-33. More particularly, a portion of hinge 534 affixes to one end of hollow temple, or arm 524 through which corresponding wires (not shown) are fed to reach a printed circuit board 570 containing a microswitch 533. PC board 570 is electrically coupled with contacts (not shown) that draw power from battery pack 531, including a pair of button batteries 574 encased in a receiving socket 572 of temple tip 528 and affixed with a threaded battery retaining cover 576.

Figure 35:
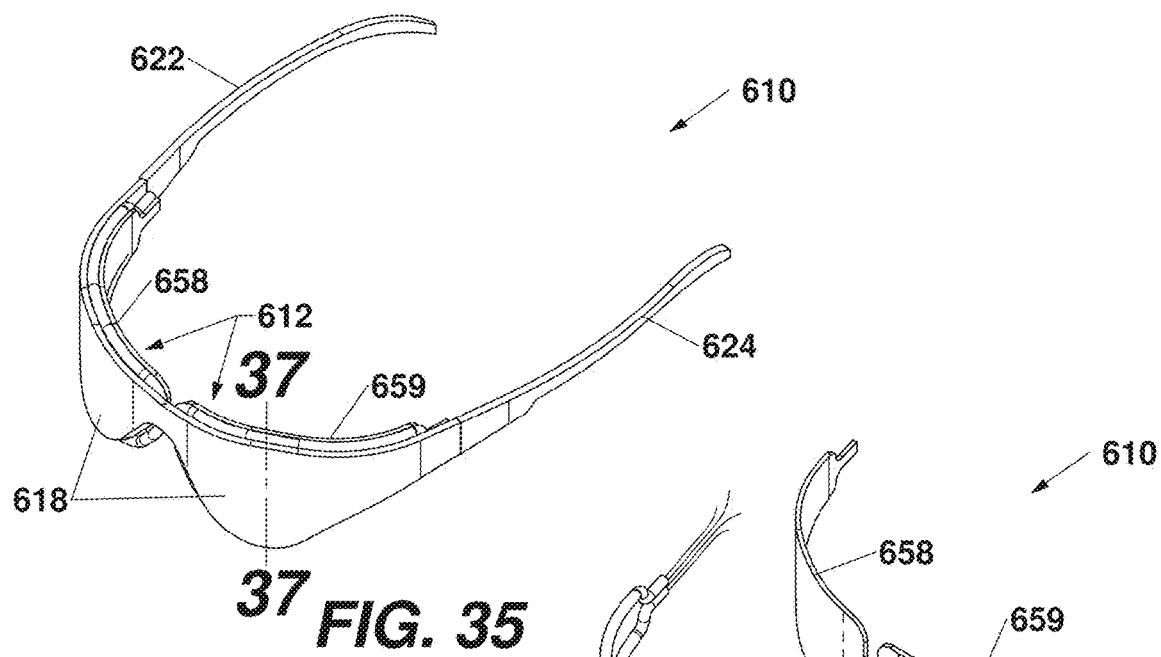
FIG. 35 is a perspective view of heated safety glasses.

FIG. 35 is an exploded perspective view of heated safety glasses 610. Glasses 610 have a heating assembly 612 comprising a central nichrome wire and an outer PTFE tube as shown above in previous designs. An outer unitary lens 618 is sandwiched with an adhesive with a first PTFE tube and a second PTFE tube of heating assembly 612 and with inner lenses 658 and 659, each tube having an internal nichrome heating wire driven by battery power and wiring (not shown) similar to that shown in the versions of FIGS. 28-34. Temples 622 and 624 are pivotally affixed via hinges to unitary lenses, or face shield 618. Optionally, optical inner lenses 658 and 659 can have perpendicular edge flanges that affix with adhesive or ultrasonic welding to an inner surface of unitary outer lens 618.

Figure 36:
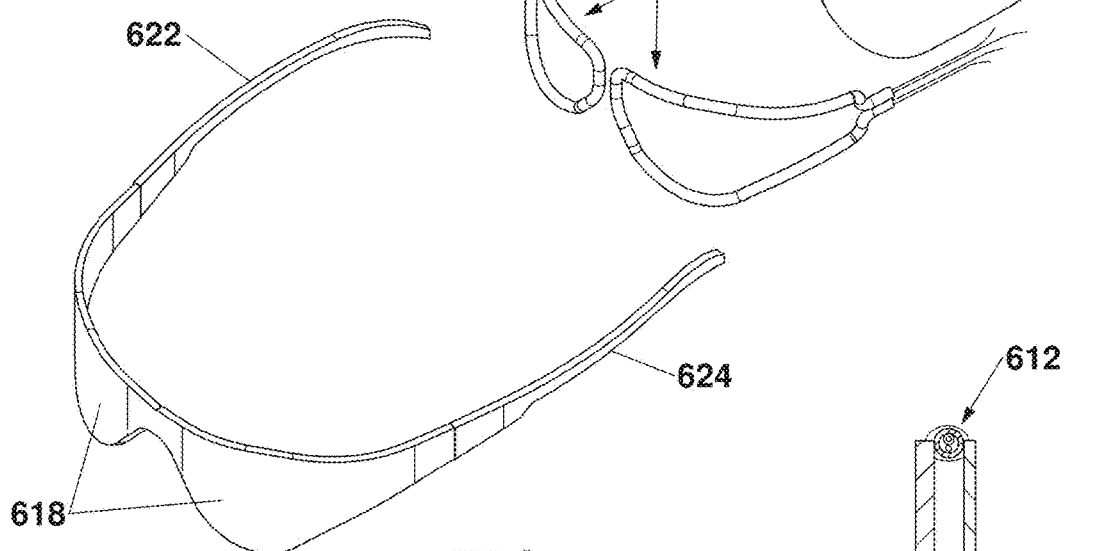
FIG. 36 is an exploded perspective view of the heated safety glasses of FIG. 35.

FIG. 36 is an exploded perspective view of the heated safety glasses 610 of FIG. 36. Outer unitary lens 618 and temples 622 and 624 are shown relative to the pair of PTFE and nichrome wire tube heaters forming heating assembly 612. Inner lenses 658 and 659 are sandwiched in assembly so that heater assembly 612 imparts heat to an air gap provided between outer lens assembly 618 and inner lenses 658 and 659, thereby reducing a volume of air or gas that needs to be heated in order to effectively heat lenses 618 and 658, 659.

Figure 37:
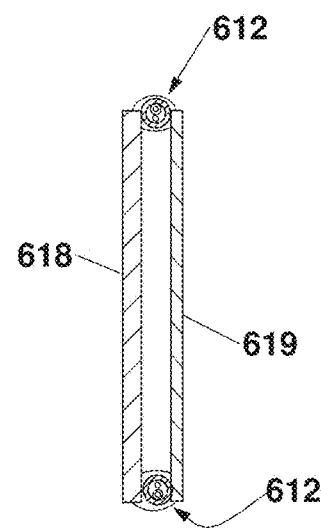
FIG. 37 is a vertical sectional view of one heated lens taken along line 37-37 of FIG. 36.

FIG. 37 is a vertical sectional view of one heated lens assembly taken along line 37-37 of FIG. 36. More particularly, outer lens 618 is affixed adhesively about an outer edge of heater assembly 612 to inner lens 619 to form a sealed and unitary sandwich heater construction for the lenses 618 and 619.

Although the elongate resistive heating element of the elongate heater is shown in many forms in FIGS. 1-37 as a resistive heating wire, or Nichrome wire, it is understood that the elongate resistive heating element can comprise a trace of resistive heat generating coating, placed down by vapor deposition or laid down as an ink, such as indium tin oxide, or a Positive Temperature Coefficient (PTC) ink trace, or layer.

According to one construction, an electrically conductive, yet partially resistive, PTC ink for generating a trace is available as Loctite brand ECI 8000 E & C Series (including ECI 8120 PTC printable ink) from Henkel Corporation 14000 Jamboree Road, Irvine, CA 92606, United States. Optionally, a trace of indium tin oxide can be used. Further optionally, any other form of ink PTC traces can be used.

The terms "a", "an", and "the" as used in the claims herein are used in conformance with long-standing claim drafting practice and not in a limiting way. Unless specifically set forth herein, the terms "a", "an", and "the" are not limited to one of such elements, but instead mean "at least one".

In compliance with the statute, the various embodiments have been described in language more or less specific as to structural and methodical features. It is to be understood, however, that the various embodiments are not limited to the specific features shown and described, since the means herein disclosed comprise disclosures of putting the various embodiments into effect. The various embodiments are, therefore, claimed in any of its forms or modifications within the proper scope of the appended claims appropriately interpreted in accordance with the doctrine of equivalents.

What is claimed is:

1. Eyewear, comprising:
   a support body configured to be supported on a user;
   at least one lens carried by the support body and configured to hold the at least one lens over an eye facial region of a user;
   an elongate heating element carried by the support body proximate the at least one lens and configured to traverse an expansive surface area of the at least one lens; and
   a power supply carried by the support body and configured to power the elongate heating element.

2. The optical face protection apparatus of claim 1, wherein the eyewear comprises eyeglasses having a pair of lenses and the support body comprises a frame.

3. The optical face protection apparatus of claim 2, wherein the elongate heating element extends along a portion of each lens.

4. The optical face protection apparatus of claim 3, wherein the support body further comprises a pair of spaced apart temple pieces, the power supply carried by at least one of the temple pieces.

5. The optical face protection apparatus of claim 4, wherein each of the temple pieces comprises a temple tip, at least one of the temple tips configured to carry the power supply.

6. The optical face protection apparatus of claim 5, wherein the power supply comprises a button battery.

7. The optical face protection apparatus of claim 6, wherein each temple comprises a hollow tube, and further comprising electrically conductive wires extending through the hollow tube between the button battery and the elongate heating element.

8. The optical face protection apparatus of claim 7, further comprising a switch provided on temple configured to energize and deenergize the heating element relative to the battery.

9. The optical face protection apparatus of claim 8, further comprising a timer electrically coupled with the switch to energize for a predetermined time the heating element.

10. The optical face protection apparatus of claim 1, wherein the elongate heating element comprises an elongate tube and a heat source provided in the tube.

11. The optical face protection apparatus of claim 10, wherein the heat source comprises an elongate resistive heating element and the tube comprises a thermally transmissive, temperature mitigating, and electrically insulative material.

12. The optical face protection apparatus of claim 11, wherein the elongate resistive heating element comprises an elongate trace of resistive heating material.

13. The optical face protection apparatus of claim 11, wherein the elongate resistive heating element comprises an electrically resistive Nichrome wire.

14. Eyewear, comprising:
a frame configured to be worn on a user;
at least one lens carried by the frame and configured to hold the at least one lens over an eye facial region of a user;
an elongate electrically resistive heating element carried in thermally transmissive, temperature mitigating, and electrically insulative relation relative to the lens and an environment about the lens and configured to extend across a portion of the at least one lens; and
a battery power supply carried by the frame and configured to power the elongate resistive heating element.

15. The eyewear of claim 14, wherein the eyewear comprises eyeglasses having a pair of laterally spaced apart lenses, the elongate resistive heating element configured to extend along the pair of lenses.

16. The eyewear of claim 15, wherein the elongate resistive heating element comprises a tube of thermally transmissive, temperature mitigating, and electrically insulative material.

17. The eyewear of claim 16, further comprising an electrically resistive wire provided in the tube.

18. The eyewear of claim 16, further comprising a resistive heat generating trace provided in the tube.

19. The eyewear of claim 14, further comprising a selectively activated electrical circuit provided between the power supply and the heating element and a switch configured to energize and deenergize power to the heating element.

20. The eyewear of claim 19, further comprising a timer coupled to the switch and configured to energize heat delivery for a predetermined period of time.

* * * * *